(12) United States Patent
E

(10) Patent No.: US 10,368,140 B2
(45) Date of Patent: Jul. 30, 2019

(54) INFORMATION PROCESSING METHOD AND APPARATUS, TERMINAL AND STORAGE MEDIUM

(71) Applicant: Tencent Technology (Shenzhen) Company Limited, Shenzhen (CN)

(72) Inventor: Wanyou E, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 15/627,147

(22) Filed: Jun. 19, 2017

(65) Prior Publication Data

US 2017/0318355 A1 Nov. 2, 2017

Related U.S. Application Data

(63) Continuation of application No. PCT/CN2016/070429, filed on Jan. 7, 2016.

(30) Foreign Application Priority Data

Mar. 23, 2015 (CN) .......................... 2015 1 0128131

(51) Int. Cl.
*H04N 7/16* (2011.01)
*H04N 21/6587* (2011.01)
(Continued)

(52) U.S. Cl.
CPC ....... *H04N 21/6587* (2013.01); *H04N 21/431* (2013.01); *H04N 21/472* (2013.01); *H04N 21/47217* (2013.01); *H04N 21/812* (2013.01)

(58) Field of Classification Search
CPC ....... H04N 21/25891; H04N 21/47202; H04N 21/4312; H04N 21/482; H04N 21/84;
(Continued)

(56) References Cited

U.S. PATENT DOCUMENTS

| 5,559,949 A | 9/1996 | Reimer et al. |
| 5,596,705 A | 1/1997 | Reimer et al. |

(Continued)

FOREIGN PATENT DOCUMENTS

| CN | 102945234 A | 2/2013 |
| CN | 103686413 A | 3/2014 |

(Continued)

OTHER PUBLICATIONS

Tencent Technology, ISR, PCT/CN2016/070429, Apr. 7, 2016, 2 pgs.

*Primary Examiner* — Jason P Salce
(74) *Attorney, Agent, or Firm* — Morgan, Lewis & Bockius LLP

(57) ABSTRACT

An information processing method performed at a terminal includes: while playing a video on a display device of the terminal, obtaining a first input operation of a user, and selecting an object from a current frame played in the video corresponding to the first input operation of the user; obtaining, from the current frame played in the video, identification information of the object corresponding to the first input operation of the user; obtaining attribute information of the object according to the identification information of the object; identifying, from the video, a preset video segment including the current frame; and replaying the video segment on the display device while displaying the attribute information of the object.

20 Claims, 17 Drawing Sheets

(51) Int. Cl.
*H04N 21/431* (2011.01)
*H04N 21/472* (2011.01)
*H04N 21/81* (2011.01)

(58) Field of Classification Search
CPC ............ H04N 21/6125; H04N 21/812; H04N 21/4722; H04N 7/17318
See application file for complete search history.

(56) References Cited

U.S. PATENT DOCUMENTS

| | | | | |
|---|---|---|---|---|
| 6,483,986 | B1* | 11/2002 | Krapf | H04N 5/44 348/E5.007 |
| 2002/0013950 | A1* | 1/2002 | Tomsen | G06Q 10/10 725/109 |
| 2003/0056222 | A1* | 3/2003 | Iwata | G06Q 30/016 725/87 |
| 2006/0026655 | A1* | 2/2006 | Perez | G06Q 30/02 725/91 |
| 2006/0222076 | A1* | 10/2006 | Ludvig | H04N 7/17336 375/240.16 |
| 2007/0226432 | A1* | 9/2007 | Rix | G06F 17/30849 711/154 |
| 2008/0184121 | A1* | 7/2008 | Kulas | G06F 3/04842 715/723 |
| 2009/0025039 | A1* | 1/2009 | Bronstein | G06F 17/3079 725/60 |
| 2010/0037138 | A1* | 2/2010 | Shcherbakov | G06F 17/30781 715/716 |
| 2012/0167144 | A1* | 6/2012 | Avison-Fell | H04N 21/8586 725/51 |
| 2012/0210371 | A1* | 8/2012 | McCoy | H04N 21/42219 725/62 |
| 2012/0213495 | A1* | 8/2012 | Hafeneger | G11B 27/034 386/282 |
| 2012/0294583 | A1* | 11/2012 | Kosaka | G06T 3/4038 386/230 |
| 2013/0174195 | A1 | 7/2013 | Witenstein-Weaver | |
| 2013/0219425 | A1* | 8/2013 | Swartz | H04N 21/458 725/32 |
| 2014/0219629 | A1* | 8/2014 | McIntosh | G11B 27/105 386/241 |
| 2015/0003816 | A1* | 1/2015 | Clapper | H04N 9/8715 386/343 |
| 2016/0110041 | A1* | 4/2016 | Fuzell-Casey | G06F 3/0482 715/719 |
| 2017/0013288 | A1* | 1/2017 | Clapper | H04N 9/8715 |

FOREIGN PATENT DOCUMENTS

| | | |
|---|---|---|
| CN | 104113786 A | 10/2014 |
| CN | 104145267 A | 11/2014 |
| CN | 104184923 A | 12/2014 |
| CN | 104837050 A | 8/2015 |

\* cited by examiner

INFORMATION PROCESSING METHOD AND APPARATUS, TERMINAL AND STORAGE MEDIUM

PRIORITY CLAIM AND RELATED APPLICATION

This application is a continuation application of PCT Patent Application No. PCT/CN2016/070429, entitled "INFORMATION PROCESSING METHOD AND APPARATUS, TERMINAL, AND MEMORY MEDIUM" filed on Jan. 7, 2016, which claims priority to Chinese Patent Application No. 201510128131.2, entitled "INFORMATION PROCESSING METHOD AND APPARATUS, TERMINAL, AND STORAGE MEDIUM" filed on Mar. 23, 2015, both of which are incorporated by reference in their entirety.

FIELD OF THE TECHNOLOGY

The present disclosure relates to video display technologies, and in particular, to an information processing method and apparatus, a terminal, and a storage medium.

BACKGROUND OF THE DISCLOSURE

With development of movie and television markets, especially, vigorous development of commercial movies, implicit placement of commercial advertisements in movie and television videos becomes a common and mature commercial marketing technique. Product placement is an advertising manner by blending a representative visual brand symbol of a product and a service thereof into a product on a screen or stage, to leave a distinct impression on an audience, thereby achieving an objective of promotion. By combining a product or service of a vendor with a story of a movie or a television show, product placement achieves an effect of promotion by means of subtle influence. Product placement can effectively ease the natural dislike of an audience for an advertisement. As compared with hard sell, a better effect is achieved in an entertaining manner by combining a product into a movie or a television show. As shown in FIG. 1-1, an advertisement of Shuhua milk 11 of a company is placed in a picture of the movie Transformers: Dark of the Moon. As shown in FIG. 1-2, an advertisement of a necklace 12 of a brand is placed in a television show. In combination with a story of a movie or a television show, implicit product placement may easily attract attention of an audience that is intently concentrating. In addition, stars in movies and television shows make great role models that may deeply affect an audience of an advertisement. Therefore, product placement is an effective marketing technique and can achieve strong brand pervasiveness. However, meanwhile, product placement in a video needs to be blended with a story of a movie or a television show. There are very high requirements for scenes and duration of presenting an advertisement, and information presented in the advertisement to users is very limited. In most of the cases, a placed product only appears in several frames of pictures of a video, and users can only learn more information about the product by means of other methods.

Currently, an article that appears in a video can only be unidirectionally presented to a user during playing of the video, and "unidirectionally" means that only information of the article is conveyed to the user. For example, for the advertisement of the necklace in FIG. 1-2, a user can only learn a brand of the necklace from a box of the necklace 12, and cannot conveniently learn more attribute information of the article. In other words, for an article that appears in a video, except information presented by the article in the video, a user cannot learn more about attribute information such as a price of the article. Therefore, in the existing technology, because of effects of stars, an article that appears in a video can easily draw the attention of users. However, an amount of information that can be conveyed to users by an advertisement inserted in a video is very limited, so that it is inconvenient for the users to learn attribute information of the article.

SUMMARY

In view of the above, in order to resolve at least one problem existing in the existing technology, implementations of the present application provide an information processing method and apparatus, a terminal, and a storage medium, so as to present, to a user, attribute information of an object in which the user is interested in a video, so as to save the user the trouble of searching for the object, so that the user can easily learn more information about the object in the video, thereby improving user experience.

Technical solutions in the implementations of the present application are implemented in this way.

According to a first aspect, an implementation of the present application provides an information processing method, the method including:

playing, by a terminal, a video on a display device of the terminal;

obtaining, by the terminal, a first input operation of a user, the first input operation being used for selecting an object from a current frame played in the video;

obtaining, by the terminal from the current frame played in the video, identification information of the object corresponding to the first input operation of the user;

obtaining, by the terminal, attribute information of the object according to the identification information of the object; and displaying, by the terminal, the attribute information of the object.

According to a second aspect, an implementation of the present application provides an information processing apparatus, the apparatus including a playing unit, a first obtaining unit, a second obtaining unit, a third obtaining unit, and a display unit, the playing unit being configured to play a video on a display device of a terminal;

the first obtaining unit being configured to obtain a first input operation of a user, the first input operation being used for selecting an object from a current frame played in the video;

the second obtaining unit being configured to obtain, from the current frame played in the video, identification information of the object corresponding to the first input operation of the user;

the third obtaining unit being configured to obtain attribute information of the object according to the identification information of the object; and the display unit being configured to display the attribute information of the object.

According to a third aspect, an implementation of the present application provides a computer storage medium, the computer storage medium storing a computer executable instruction, and the computer executable instruction being used for executing the information processing method provided in the implementation of the first aspect of the present disclosure.

According to a fourth aspect, this implementation of the present application provides a terminal, the terminal including:

a display device, configured to display a video to be played, and display attribute information that is of an object and is output by a processing apparatus; and the processing apparatus, configured to: play the video on the display device, obtain a first input operation of a user, the first input operation being used for selecting an object from a current frame played in the video, obtain, from the current frame played in the video, identification information of the object corresponding to the first input operation of the user, obtain the attribute information of the object according to the identification information of the object, and display the attribute information of the object on the display device.

According to a fifth aspect, an implementation of the present application provides a terminal, the terminal including:

a storage medium, configured to store a computer executable instruction; and a processor, configured to execute the computer executable instruction stored on the storage medium, the computer executable instruction including: playing a video on a display device, obtaining a first input operation of a user, the first input operation being used for selecting an object from a current frame played in the video, obtaining, from the current frame played in the video, identification information of the object corresponding to the first input operation of the user, obtaining attribute information of the object according to the identification information of the object, and displaying the attribute information of the object on the display device.

The implementations of the present application provide the information processing method and apparatus, the terminal, and the storage medium. A terminal plays a video on a display device of the terminal. The terminal obtains a first input operation of a user, the first input operation being used for selecting an object from a current frame played in the video. The terminal obtains, from the current frame played in the video, identification information of the object corresponding to the first input operation of the user. The terminal obtains attribute information of the object according to the identification information of the object. The terminal displays the attribute information of the object. In this way, attribute information of an object in which a user is interested in a video can be presented to the user, so as to save the user the trouble of searching for the object, so that the user can easily learn more information about the object in the video, thereby improving user experience.

BRIEF DESCRIPTION OF THE DRAWINGS

FIG. 1-2 is a schematic scenario diagram 2 in the related technology;

FIG. 1-3 is a schematic flowchart of implementing an information processing method according to Embodiment 1 of the present application;

FIG. 1-4 is a schematic scenario diagram according to Embodiment 1 of the present application;

FIG. 2 is a schematic scenario diagram according to Embodiment 2 of the present application;

FIG. 3 is a schematic scenario diagram according to Embodiment 3 of the present application;

FIG. 4 is a schematic scenario diagram according to Embodiment 4 of the present application;

FIG. 5-1 is a schematic flowchart of implementing an information processing method according to Embodiment 5 of the present application;

FIG. 5-2 is a schematic diagram of an index list according to Embodiment 5 of the present application;

FIG. 6-1 is a schematic flowchart 1 of implementing an information processing method according to Embodiment 6 of the present application;

FIG. 6-2 is a schematic flowchart 2 of implementing an information processing method according to Embodiment 6 of the present application;

FIG. 7-1 is a schematic flowchart of implementing an information processing method according to Embodiment 7 of the present application;

FIG. 7-2 is a schematic diagram of a relationship among a writer, a reader, and an output device according to Embodiment 7 of the present application;

FIG. 12-1 is a schematic composition structural diagram of a terminal and a server according to Embodiment 12 of the present application;

FIG. 12-2 is a schematic flowchart of implementing displaying of attribute information of an object to a user according to Embodiment 12 of the present application; and FIG. 12-3 is a schematic flowchart of implementing addition of attribute information of an object by a user according to Embodiment 12 of the present application.

DESCRIPTION OF EMBODIMENTS

For the foregoing problem, an implementation of the present application provides an information processing method. In a process of watching a video by a user, if the user is interested in an object that appears in a picture of the video, the user positions, by using an input device such as a mouse, the object that appears in the video. Therefore, a playing device can obtain identification information of the object, the playing device then obtains attribute information of the object corresponding to the identification information of the object, and the playing device finally presents the attribute information of the object to the user. By means of the technical solution provided in this implementation of the present application, a playing device can obtain an object in which a user is interested, and presents attribute information of the object to the user in a process of watching a video by the user, so as to save the user the trouble of searching for the object, so that the user can easily learn more information about the object in the video.

The technical solutions of the present disclosure are further described below in detail with reference to the accompanying drawings and implementations.

Embodiment 1

This implementation of the present application provides an information processing method, applied to a terminal.

Functions implemented by the information processing method may be implemented by a processor in the terminal invoking a program code. Certainly, the program code may be stored in a computer storage medium. Hence, the terminal at least includes the processor and the storage medium.

Figure 1:
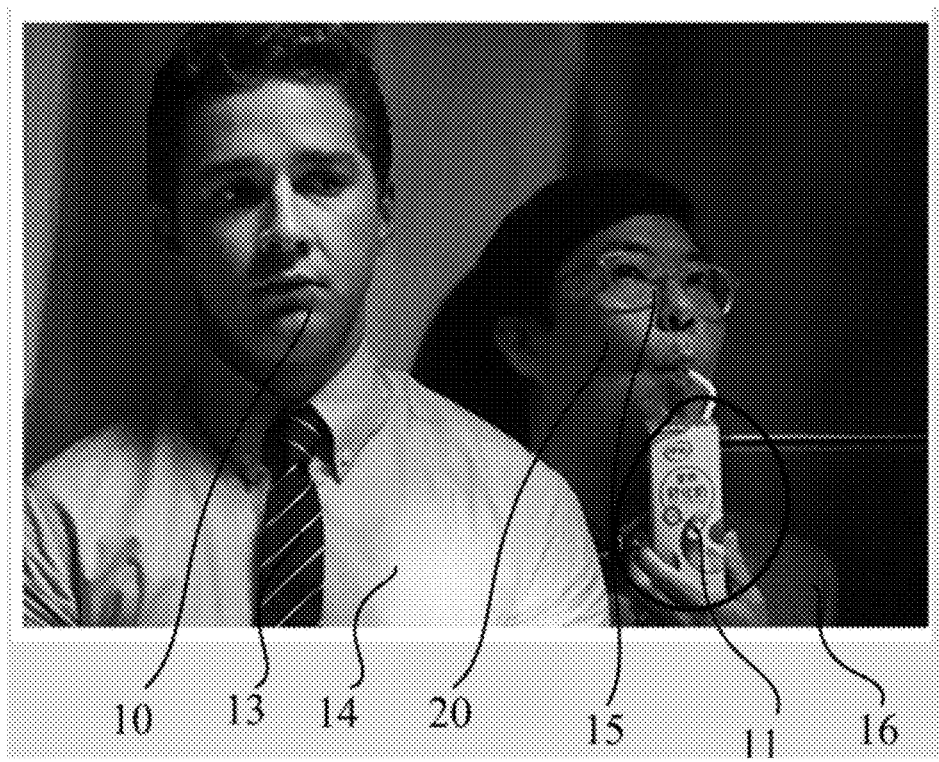
FIG. 1-1 is a schematic scenario diagram 1 in the related technology.
Figures 1, 2:
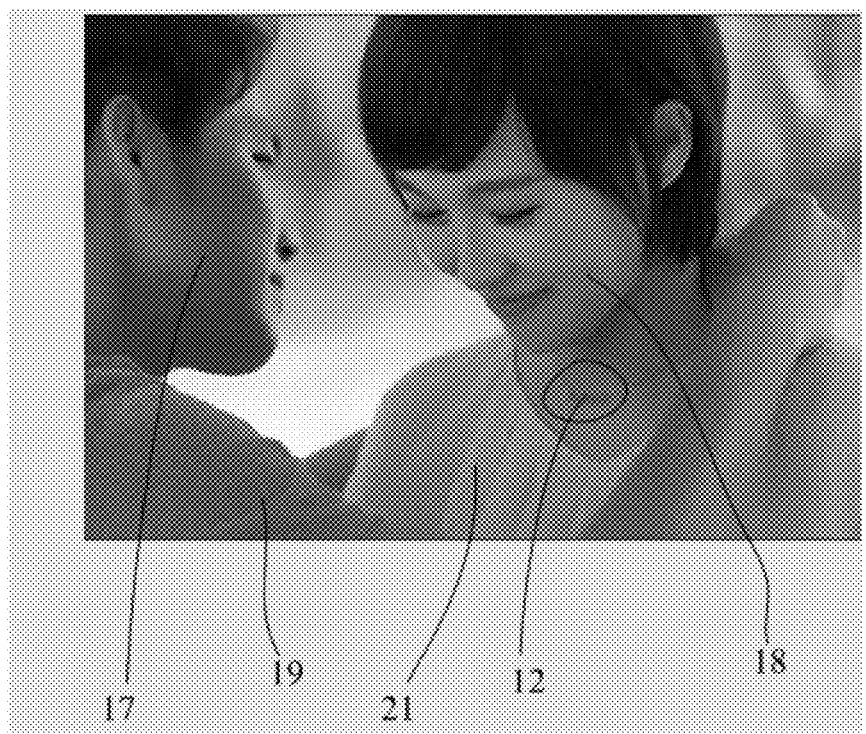
Figures 1, 2, 3:
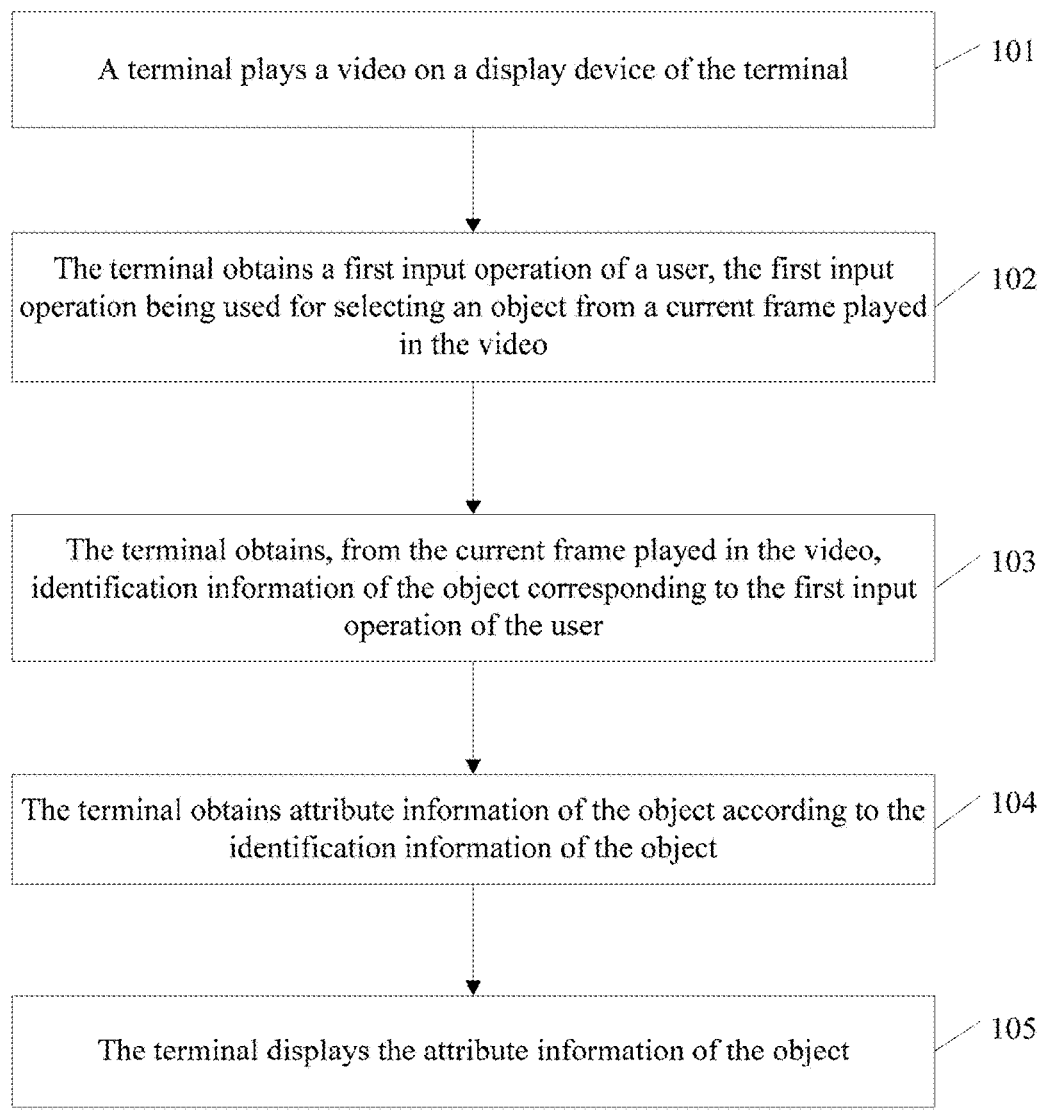

FIG. 1-3 is a schematic flowchart of implementing an information processing method according to Embodiment 1 of the present application. As shown in FIG. 1-3, the information processing method includes:

Step 101: A terminal plays a video on a display device of the terminal.

Here, the terminal includes a video playing device such as a smartphone, a personal computer, a notebook computer, an Internet notebook computer (netbook), a tablet computer, a desktop computer, or a smart television.

Step 102: The terminal obtains a first input operation of a user, the first input operation being used for selecting an object from a current frame played in the video. In some implementations, the first input operation also pauses the play of the video temporarily or reduces the speed of playing the video so that the user can handle the subsequent steps without too much distraction.

Here, the object includes an article, a person, an animal, a plant, an interlude, or a staff member in the credits. For example, articles in FIG. 1-1 include a shirt 14, a tie 13, milk 11, glasses 15, and a jacket 16. Articles in FIG. 1-2 include a short sleeved shirt 19, a necklace 12, and a chiffon shirt 21. Persons in FIG. 1-1 include an actor 10 and an actor 15. Persons in FIG. 1-2 include an actor 17 and an actress 18.

Here, the first input operation differs according to a type of the terminal. For example, when the terminal is a common personal computer and the input device is a mouse, the first input operation may be a click operation on the video by the user by using the mouse. Certainly, the object on the video may be an object selected by the click operation by the mouse. When a display device of the terminal is a touch control display screen (for example, a smartphone, a tablet computer, or a desktop computer), the first input operation may be a touch control operation of an operation body, and the operation body includes a finger or a stylus. It should be noted that a person skilled in the art may customize a specific operation manner of the first input operation. For example, the first input operation may include an operation of triggering pause of the video by the user. For example, the first input operation is a series of operations as follows: The user pauses the video, and the user makes a display cursor of the mouse slide on the video till the display cursor of the mouse stops at an object in the video; in this way, the object in the current frame played in the video is selected. Certainly, the first input operation may also be that the user touches the object on the current frame with a finger, or the user makes a display cursor of the mouse stop at the object in the current frame. A specific implementation is not limited to the manner provided in this implementation of the present application. A person skilled in the art may further implement the foregoing first input operation by means of various existing technologies, and details are not described herein.

Step 103: The terminal obtains, from the current frame played in the video, identification information of the object corresponding to the first input operation of the user.

Here, the identification information of the object may be information such as a number or a name of the object.

Step 104: The terminal obtains attribute information of the object according to the identification information of the object.

Here, the attribute information of the object may be any information of the object. When the object is an article, an attribute of the article may include a commodity name of the article, a brand of the article, a price, a place of origin, a selling mall, and users for whom the article is suitable. When the object is a person, the attribute information of the object may include information such as a name, a height, and a birth place of the person. When the object is an animal, the attribute of the object may include information such as a name of the animal, a genus of the animal, a distribution range, a protection level, a morphological feature, and a living habit. When the object is a plant, the attribute of the object may include information such as a plant name, a morphological feature, a growth environment, a distribution range, and a breeding method.

Here, the attribute information of the object obtained by the terminal according to the identification information of the object may be locally stored, may be obtained from a server that pushes a video, or may be further obtained from a third-party server, where the third-party server may be a server of a search engine, or the like.

Step 105: The terminal displays the attribute information of the object.

Here, the terminal displays the attribute information of the object by using a display device of the terminal. In a preferred implementation manner, Step 105 may be that: the terminal outputs the attribute information of the object in a manner of a floating layer.

The technical solution provided in this implementation of the present application may be used in a scenario in the following. As shown in FIG. 1-4, when a user finds an object in which the user is interested in a process of watching a video, the user initiates a positioning operation (a first input operation). For example, a user watches a video on a terminal (as shown in FIG. 1-4-*a*), and it is first assumed that a display of the terminal is a touch control display screen, so that the terminal may receive a touch control operation of the user. Alternatively, the terminal may receive a control operation from the user through a mouse click at a particular location on the display screen. In a process of watching the video, the user finds that the necklace 12 worn by a heroine looks nice. Therefore, the user may stop a finger at the necklace 12 (as shown in FIG. 1-4-*b*), that is, the user selects the necklace 12 from the current frame of the video, and in this way, the terminal receives the touch control operation (the first input operation) of the user. Next, the terminal obtains, from the current frame played in the video, a number of the necklace 12 corresponding to the first input operation (the number is used as the identification information of the necklace 12). Next, the terminal obtains attribute information of the necklace 12 according to the number of the necklace 12. The terminal displays the attribute information of the necklace 12 in a manner of a floating layer while pausing the play of the video. As shown in FIG. 1-4-*c*, the attribute information of the necklace 12 is displayed to the user in a form of a floating layer 140, and the attribute information of the necklace 12 includes: Commodity name: Sunshine necklace, Brand: ZOCAI, Designer: Unknown, Price: ¥1899.0 to ¥2499.0, Selling malls: Jingdong mall, Suning.com, ZOCAI stores and the official website of ZOCAI, Similar commodities of the brand, and Brand introduction. The floating layer 140 includes a close button 141. When triggering the close button 141, the user can close the floating layer 140. Content displayed in the floating layer 140 may further have a link. For example, a selling mall 142 of the necklace 12 may be opened in a manner of a link. Therefore, when the finger of the user touches the selling mall 142, content 143 linked to the selling mall 142 is displayed.

During a specific implementation, the floating layer 140 has a particular display duration, for example, display duration of 30 seconds, and after the display duration ends, the terminal automatically closes the floating layer 140. In some implementations, a preset video segment including (e.g., ending with) the video frame including the necklace 12 corresponding to the first input operation is identified and the video segment is replayed repeatedly until the display duration ends. Note that the video segment may be replayed at a speed the same as the original speed of playing the video or at a speed slower than the original speed. In some implementations, the preset video segment may have a fixed length (e.g., 3 seconds in time). In some other implementations, the preset video segment may have a variable length such that it only has frames including the user-selected object on the display screen. In some implementations, when playing a next frame after the current frame in the video, the terminal automatically closes the floating layer of the current frame. Alternatively, the floating layer may also be displayed according to the duration of the first input operation. For example, when the finger of the stays on the necklace 12, the floating layer 140 stays being displayed, and when the finger of the user leaves the necklace 12, the floating layer also disappears accordingly.

Embodiment 2

The technical solution provided in Embodiment 1 of the present application may further be used in a following scenario. In an example shown in FIG. 1-4, an object in a video is an article. Certainly, the object in the video may further be a person. As shown in FIG. 2, a user watches a video on a terminal (as shown in FIG. 2-*a*), and it is first assumed that a display of the terminal is a touch control display screen, so that the terminal may receive a touch control operation of the user. In a process of watching the video, the user finds that an actor is unfamiliar, and therefore wants to see data of an actor 17. Therefore, the user may stop a finger at the actor 17 (as shown in FIG. 2-*b*, it should be noted here that if the finger stops at the clothes of the actor 17, instead of the actor, the obtained object may be probably a jacket of the actor. However, if the terminal cannot obtain the clothes of the actor, and it is assumed that the terminal can only obtain attribute information of the actor and the actress, when the finger of the user stops at the clothes of the actor, the object obtained by the terminal is also the actor), that is, the user selects the actor from a current frame of the video, and in this way, the terminal receives a touch control operation (a first input operation) of the user. Next, the terminal obtains, from the current frame played in the video, a number (the number is used as identification information of the actor 17) of the actor 17 corresponding to the first input operation. The terminal then obtains attribute information of the actor 17 according to the number of the actor 17. The terminal displays the attribute information of the actor 17 in a manner of a floating layer. As shown in FIG. 2-*c*, the attribute information of the actor 17 is displayed to the user in a form of a floating layer 140. The attribute information of the actor 17 includes: Chinese name: ZHONG Hanliang, English name: Wallace Chung, Other names: Little Sun and Xiao Wa, Nationality: People's Republic of China, Nation: Han, Sign: Sagittarius, Blood type: A, Height: 183 cm, Weight: 70 kg, Birth place: Hong Kong, and More information. The attribute information of the actor 17 displayed in the floating layer 140 may further have a link. For example, More information 139 may be opened in a manner of a link. Therefore, when the finger of the user touches the More information 139, the terminal displays more information about the actor 17 in the floating layer 140 (as shown in FIG. 2-*d*).

FIG. 2-*c*1 is an enlarged view of the floating layer 140 in FIG. 2-*c*, and FIG. 2-*d*1 is an enlarged view of the floating layer 140 in FIG. 2-*d*. When the user touches the actor 17 on the display screen, the floating layer 140 displays the attribute information of the actor 17 (as shown in FIG. 2-*c*1). When the user touches the More information 139 in FIG. 2-*c*1, the floating layer 140 displays more data of the actor 17 (as shown in FIG. 2-*d*1). The more data is, for example: Filmography: Imminent Crisis/The Stand-In/Too late to say loving you/The Continent, Major achievements: Audience's Favorite Actor in the Hong Kong, Macau, and Taiwan region at the 2012 Golden Eagle TV Art Festival, Nomination of Audience's Choice for Actor at the 26$^{th}$ Golden Eagle Award, Best Stage-Performance Male Singer of Beijing Pop Music Awards 2011, Best Stage-Performance Male Singer of Beijing Pop Music Awards 2010, Best Actor award at the 3rd LeTV awards, and Taiwan Top Ten Idols Award in 96 and 97.

Embodiment 3

FIG. 1-4 displays a played picture in a full screen manner, and FIG. 2 shows a display manner different from that in FIG. 1-4. The played picture of the video in FIG. 2 occupies a part of a display screen (a non-full screen manner), and other parts of the display screen are used for displaying content other than the played picture, where the content is, for example, another recommended video related to the played video. In both FIG. 2 and FIG. 1-4, a floating layer 140 used for displaying attribute information of an object in the video is located on a display picture. When the non-full screen manner shown in FIG. 2 is used to display a picture of the played video, the floating layer 140 may be not located on the display picture. For example, when a user watches a video on a terminal (as shown in FIG. 3-*a*), it is first assumed that a display of the terminal is a touch control display screen, so that the terminal may receive a touch control operation of the user. In a process of watching the video, the user finds that an actor is unfamiliar, and therefore wants to see data of an actor 17. Therefore, the user may stop a finger at the actor 17 (as shown in FIG. 3-*b*). That is, the user selects the actor 17 from the current frame of the video, and in this way, the terminal receives the touch control operation (a first input operation) of the user. Next, the terminal obtains, from the current frame played in the video, a number of the actor 17 corresponding to the first input operation, and then the terminal obtains attribute information of the actor 17 according to the number of the actor 17. The terminal displays the attribute information of the actor 17 in a manner of a floating layer. As shown in FIG. 3-*c*, the attribute information of the actor 17 is displayed to the user in a form of a floating layer 140, where the floating layer 140 is displayed in an area outside the played picture. The attribute information of the actor 17 displayed in the floating layer 140 may further have a link. For example, more information 139 may be opened in a manner of a link. Therefore, when the finger of the user touches the More information 139, the terminal displays more information about the actor 17 in the floating layer 140 (as shown in FIG. 3-*d*). More information may also be displayed in the floating layer 140, that is, a picture is switched in the floating layer.

FIG. 3-*c*2 is an enlarged view of the floating layer 140 in FIG. 3-*c*, and FIG. 3-*d*2 is an enlarged view of the floating layer 140 in FIG. 3-*d*. When the user touches the actor 17, the floating layer 140 displays the attribute information of the actor 17 (as shown in FIG. 3-*c*2). When the user touches the More information in FIG. 3-*c*2, the floating layer 140 displays more data of the actor 17 (as shown in FIG. 3-*d*2).

Embodiment 4

The first input operation in Embodiment 1 of the present application may further be that: a user pauses a video, and a terminal obtains the first input operation. In other words, the first input operation is an operation of pausing the video. In this case, in Step 103, more than one object in the video may be obtained by the terminal according to the pausing operation. For example, the terminal may obtain all objects in the video. As shown in FIG. 1-2, identification information of objects obtained by the terminal includes identification information of an actor 17, identification information of an actress 18, identification information of a short sleeved shirt 19, identification information of a necklace 12, and identification information of a chiffon shirt 21. Correspondingly, in Step 104, attribute information of the objects obtained by the terminal also include attribute information of the actor 17, attribute information of the actress 18, attribute information of the short sleeved shirt 19, attribute information of the necklace 12, and attribute information of the chiffon shirt 21. Next, in Step 105, the terminal displays the attribute information of the actor 17, the attribute information of the actress 18, the attribute information of the short sleeved shirt 19, the attribute information of the necklace 12, and the attribute information of the chiffon shirt 21 on a display device of the terminal. Certainly, in Step 105, the user may further move a mouse, and stop the mouse on an object in the video, so that the terminal displays attribute information of the object.

Figures 1, 2, 3, 4:
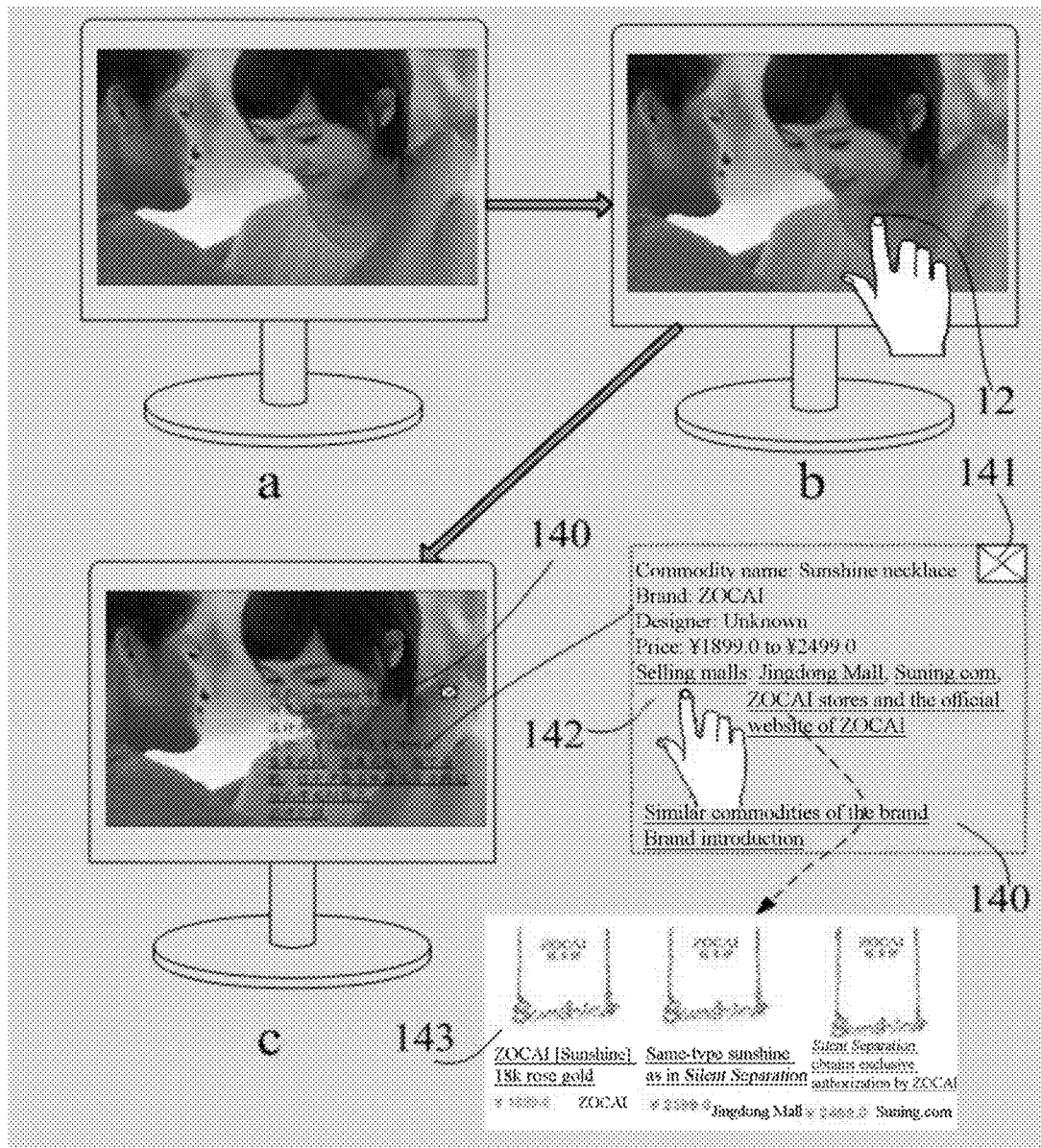
Figure 2:
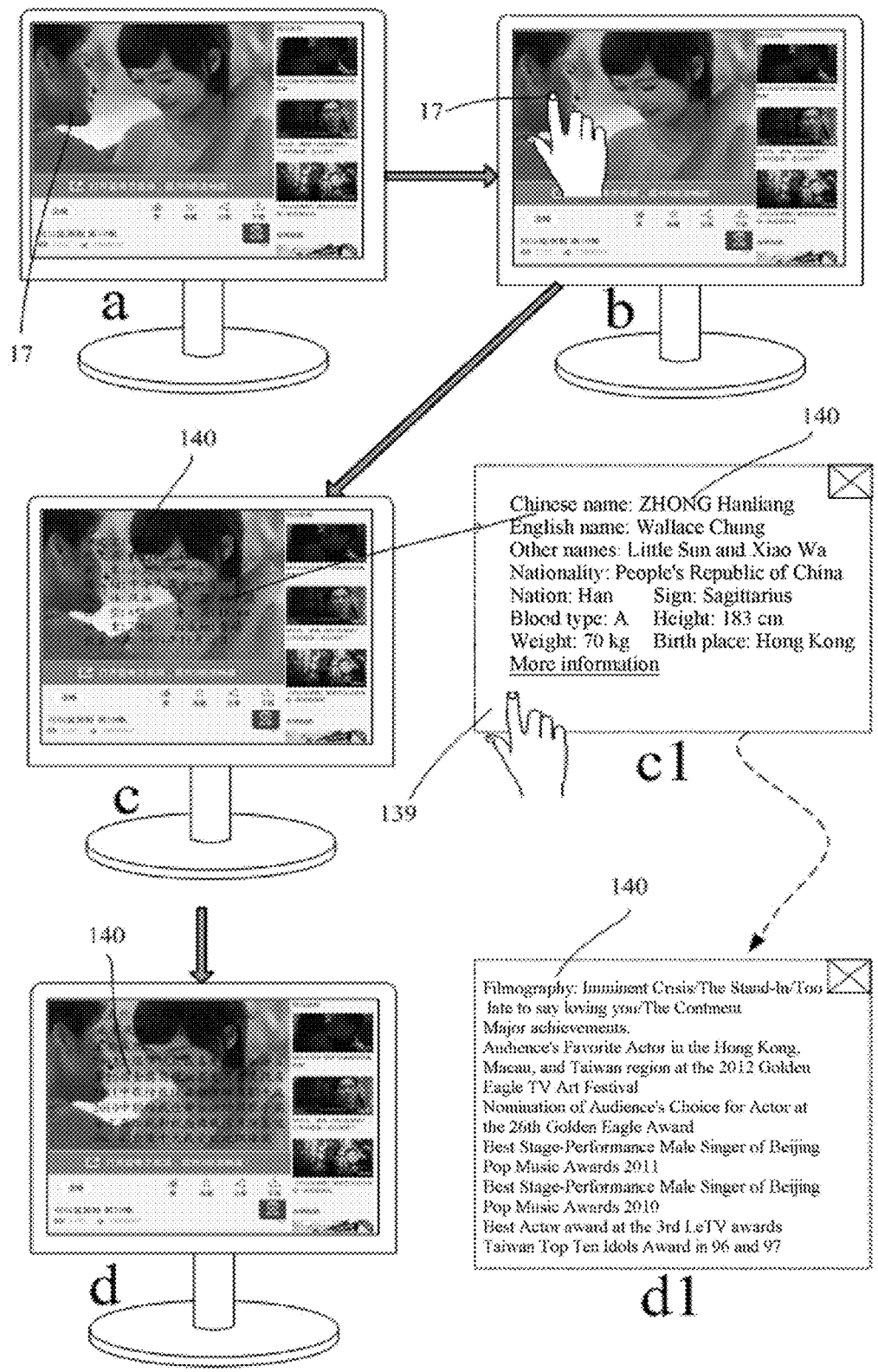
Figure 3:
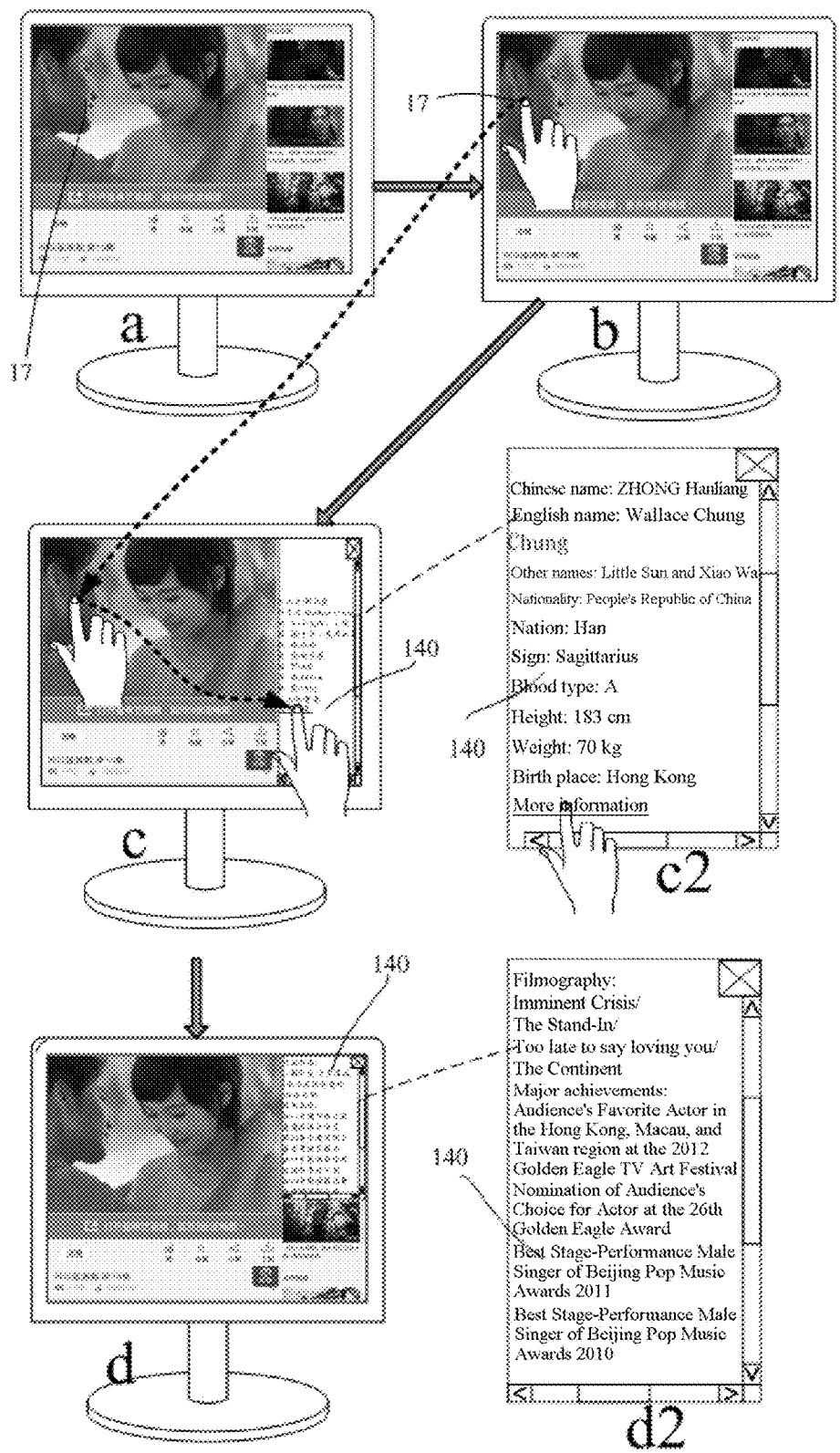
Figure 4:
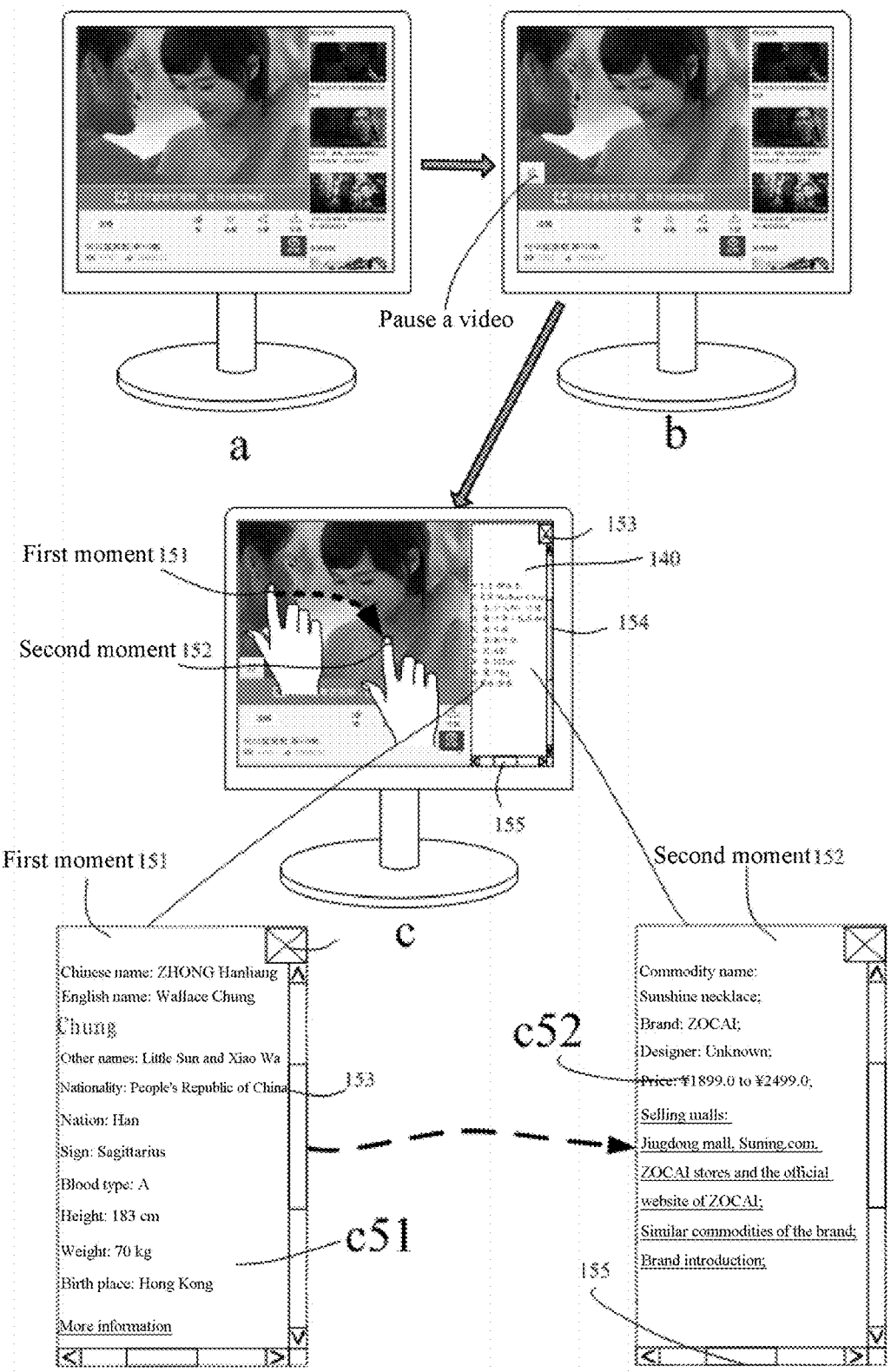

FIG. 4 is used as an example to describe that the first input operation is the operation of pausing the video. As shown in FIG. 4-*a*, a user watches a video on a terminal. At this time, the user finds an object in which the user is interested in the video, and then the user pauses the video (as shown in FIG. 4-*b*). It is assumed here that a display of the terminal is a touch control display screen, so that the terminal may receive a touch control operation of the user. In this way, the terminal receives the touch control operation (the first input operation) of the user. Next, the terminal obtains, from a current frame played in the video, identification information of objects (the objects include the actor 17, the actress 18, the short sleeved shirt 19, the necklace 12, and the chiffon shirt 21) corresponding to the first input operation, and the terminal obtains attribute information of the actor 17, the actress 18, the short sleeved shirt 19, the necklace 12, and the chiffon shirt 21. In this case, as shown in FIG. 4-*c*, the user stops a finger at the actor 17 at a first moment 151, and the user stops the finger at the necklace 12 at a second moment 152. Therefore, the terminal displays the attribute information of the actor 17 at the first moment 151 in a manner of a floating layer 140, and the terminal displays the attribute information of the necklace at the second moment 152 in a manner of the floating layer 140. The attribute information of the actor 17 includes: Chinese name: ZHONG Hanliang, English name: Wallace Chung, Other names: Little Sun and Xiao Wa, Nationality: People's Republic of China, Nation: Han, Sign: Sagittarius, Blood type: A, Height: 183 cm, Weight: 70 kg, Birth place: Hong Kong, and More information. The attribute information of the necklace 12 includes: Commodity name: Sunshine necklace, Brand: ZOCAI, Designer: Unknown, Price: ¥1899.0 to ¥2499.0, Selling malls: Jingdong mall, Suning.com, ZOCAI stores and the official website of ZOCAI, Similar commodities of the brand, and Brand introduction.

FIG. 4-*c*51 is an enlarged view of the floating layer 140 in FIG. 4-*c* at the first moment 151, and FIG. 4-*c*52 is an enlarged view of the floating layer 140 in FIG. 4-*c* at the second moment 152. As shown in FIG. 4-*c*51, at the first moment 151, the floating layer 140 displays the attribute information of the actor 17, and at the second moment 152, the floating layer 140 displays the attribute information of the necklace 12. As shown in FIG. 4-*c*, FIG. 4-*c*51, and FIG. 4-*c*52, the floating layer 140 may further have a close button 153, a scrollbar 155 used for horizontal movement, and a scrollbar 154 used for vertical movement.

Embodiment 5

Based on the foregoing implementations, this implementation of the present application further provides an information processing method, applied to a terminal. Functions implemented by the information processing method may be implemented by a processor in the terminal invoking a program code. Certainly, the program code may be stored in a computer storage medium. Hence, the terminal at least includes the processor and the storage medium.

Figures 1, 5:
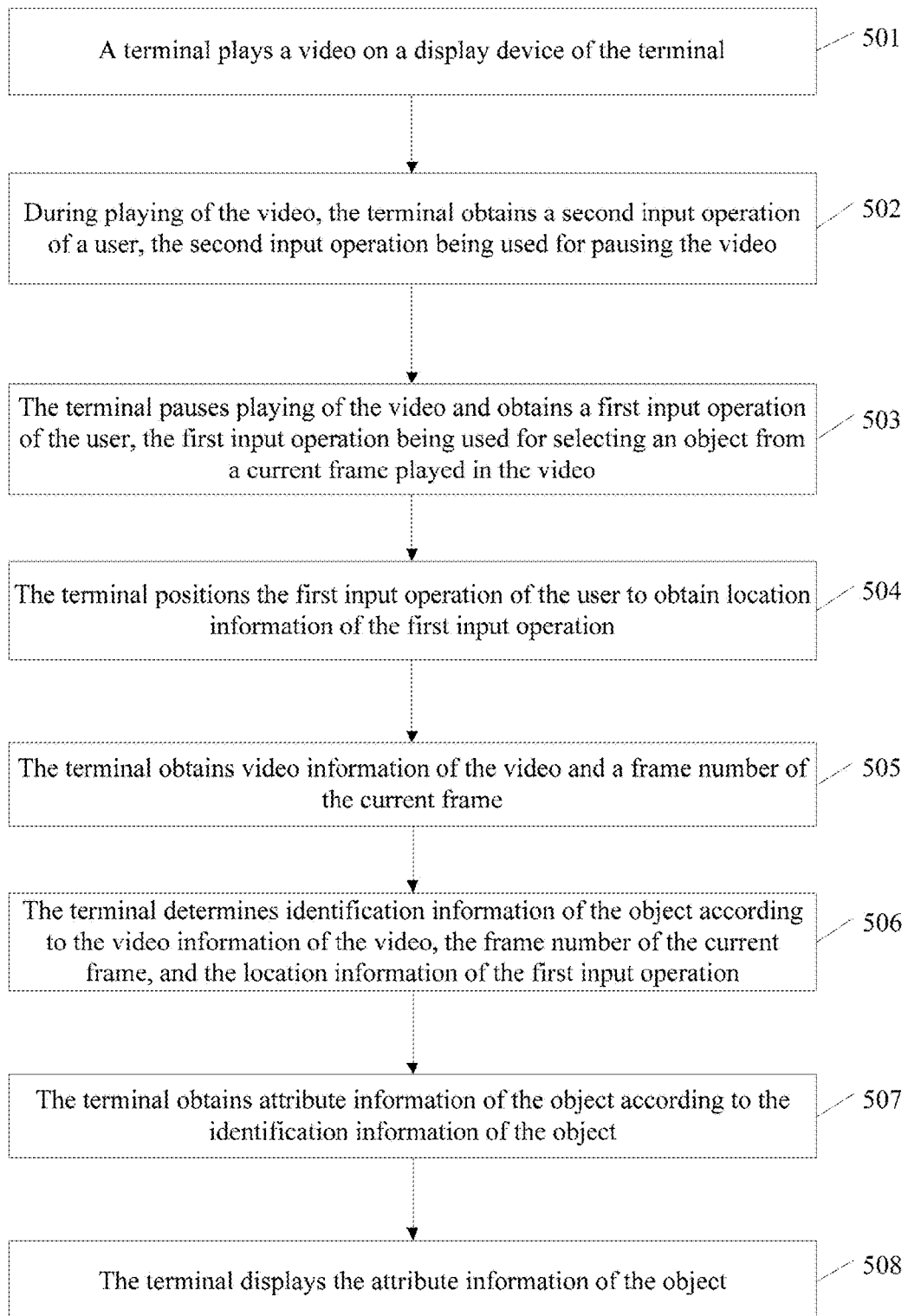
Figures 2, 5:
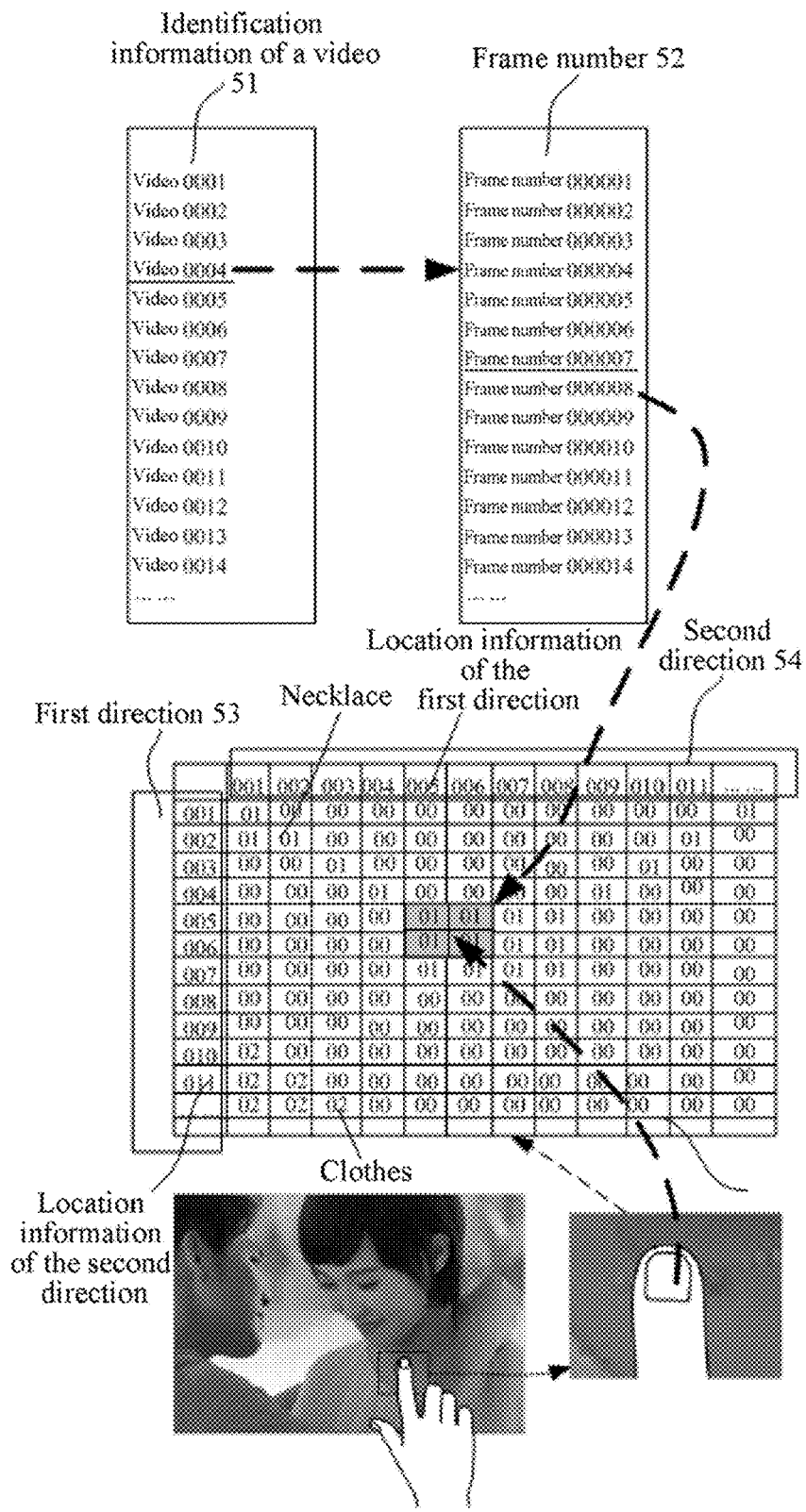

FIG. 5-1 is a schematic flowchart of implementing an information processing method according to Embodiment 5 of the present application. As shown in FIG. 5-1, the information processing method includes:

Step 501: A terminal plays a video on a display device of the terminal.

Step 502: During playing of the video, the terminal obtains a second input operation of the user, the second input operation being used for pausing the video.

Here, the second input operation differs according to different video playing applications, and a dedicated video playing application program (an application for short) is needed during the process of playing the video. For example, an operation for pausing the video set in some applications is that the user only needs to click a left key of a mouse on a playing interface of the video. An operation for pausing the video set in other applications is that the user only needs to press any key of a keyboard. An operation for pausing the video set in some applications is that the user needs to touch a dedicated pause button on the video. There may be a variety of the second input operations. For brief description, details are not described.

Step 503: The terminal pauses playing of the video, and obtains a first input operation of the user, the first input operation being used for selecting an object from a current frame played in the video.

Here, pausing of playing of the video by the terminal is a response of the terminal to the second input operation.

Step 504: The terminal positions the first input operation of the user to obtain location information of the first input operation.

Here, positioning of the first input operation differs according to different input devices of the terminal. Usually, the input devices of the terminal include a mouse and a touch control detection device. For the terminal which uses the mouse as the input device, positioning of the first input operation input by the mouse is a problem that can be resolved by the existing technology. For the terminal which uses the touch control detection device (for example, a touch panel and a touch control display screen) as the input device, positioning of the touch operation is also a problem that can be resolved by the existing technology. Therefore, a person skilled in the art may implement Step 504 according to various existing technologies, and details are not described herein.

Step 505: The terminal obtains video information of the video and a frame number of the current frame.

Here, the video information includes information such as identification information (ID information) of the video, resolution of the video, and a name of the video.

Here, the terminal may locally obtain the video information and the frame number of the current frame. When the terminal locally obtains the video information and the frame number of the current frame and when the terminal receives a video file pushed by a server, related information of a video to be played is received together, and the related information includes the identification information of the video, the resolution of the video, the name of the video, all the frame numbers of the video, and sequence information of the frame numbers. When the terminal plays a frame, the frame needs to be recorded. Therefore, the terminal may obtain the frame number of the current frame.

Step 506: The terminal determines the identification information of the object according to the video information of the video, the frame number of the current frame, and the location information of the first input operation.

Step 507: The terminal obtains attribute information of the object according to the identification information of the object.

Here, the attribute information of the object obtained by the terminal according to the identification information of the object may be locally stored, may be obtained from a server that pushes a video, or may be obtained from a server of a third party, where the server of the third party may be a server of a search engine.

Step 508: The terminal displays the attribute information of the object.

Step 504 to Step 506 in this implementation of the present application actually provide a specific implementation process of implementing that "the terminal obtains, from the current frame played in the video, identification information of the object corresponding to the first input operation of the user" (Step 103). It should be noted that in Step 506 of this implementation of the present application, the terminal may locally obtain the identification information of the object, or may request the server for the identification information of the object.

When the terminal locally obtains the identification information of the object, the terminal needs to store an index list. The terminal then queries the index list according to the video information, the frame number of the current frame, and the location information of the first input operation, to further obtain the identification information of the object. FIG. 5-2 is a schematic diagram of the index list according to Embodiment 5 of the present application. As shown in FIG. 5-2 and FIG. b of FIG. 1-4, it is assumed that the video information includes the identification information (replaced by a number) of the video and the resolution (represented by pixels) of the video. It is first assumed that the location information corresponding to the first input operation is {[05, 05], [05, 06], [06, 05], [06, 06]}, where { } indicates the location information, a first number in [ ] indicates the location information in a first direction 53, a second number in [ ] indicates the location information in a second direction 54 (the location information depends on the resolution). The number of the video is 004, and the frame number is 007. A process of determining the identification information of the object by the terminal according to the video information and the location information of the first input operation is that: The terminal may search the index list for an index with a video number of 004, then finds an index with a frame number of 007 below the index of 004, then queries a two-dimensional list according to the location information of the first input operation, a horizontal coordinate of the two-dimensional list indicating the first direction 53, and a vertical coordinate of the two-dimensional list indicating the second direction 54, and then queries the two-dimensional list according to the location information of the first input operation to obtain that the identification information of the object is 01. In this way, the identification information of the object is obtained according to the first input operation. In the two-dimensional list, the identification information 00 of the object indicates the skin of the actress, the identification information 01 of the object indicates the necklace, and the identification information 02 of the object indicates the clothes of the actress.

The foregoing describes how the terminal locally obtains the identification information of the object. Correspondingly, the foregoing process in which the terminal locally obtains the identification information of the object may also be applied to a server end. In this way, the terminal may request the identification information of the object from the server. A difference lies in that the terminal needs to send the video information of the video, the frame number of the current frame, and the location information of the first input operation to the server. The server receives the information sent by the terminal. The server then obtains the identification information of the object according to the index list shown in FIG. 5-2, and the server then sends the identification information of the object to the terminal.

In this implementation of the present application, there are four manners of implementing Step 507.

Manner 1: The terminal locally obtains the attribute information of the object according to the identification information of the object. The attribute information of the object is obtained together when the terminal requests the video from the server.

Here, the terminal stores a preset first list. The terminal may query the first list to obtain a first address, and then obtain the attribute information of the object according to the first address. The first list is used for indicating a relationship between the identification information of the object and the first address, and the first address is a storage address of the attribute information of the object. In Manner 1, because the attribute information of the object is sent by the server when the terminal requests a video resource, it is relatively fast to implement Manner 1, and implementation is not easily susceptible to a network speed. It should be noted that when a user does not perform the first input operation, the attribute information of the object does not need to be displayed. Therefore, if the terminal requests the attribute information of the object together when the terminal requests the video resource from the server, a bandwidth waste occurs. In fact, such a waste is insignificant, because the attribute information of the object is generally a text, and a bandwidth occupied by a text and a bandwidth occupied by a video are in different orders of magnitude. Because it is fast to implement Manner 1 and Manner 1 has a shorter delay, and the user is relatively sensitive to a delay, Manner 1 is a preferred manner of implementing Step 507.

Manner 2: The terminal invokes a search engine, and obtains attribute information corresponding to the identification information of the object by using the search engine.

Here, the terminal converts the identification information of the object into a keyword for search, and the keyword may be a name of the object. If the identification information of the object is the name of the object, conversion does not need to be performed, and the search engine is directly invoked, so that the attribute information of the object is obtained by using the name of the object by means of the search engine.

Manner 3 includes two steps.

Step 5071: The terminal sends the identification information of the object to the server, to trigger the server to obtain the attribute information of the object according to the identification information of the object, and send the attribute information of the object to the terminal.

Here, the server refers to a server that pushes videos to the terminal.

Step 5072: The server receives the identification information sent by the terminal, queries the first list to obtain the first address, and then obtains the attribute information of the object according to the first address.

Here, the first list and the first address are the same as those in Manner 1, and therefore, details are not described herein.

Step 5073: The server sends the attribute information of the object to the terminal.

Step 5074: The terminal receives the attribute information of the object sent by the server.

In Manner 3, because a request needs to be sent to the server, as compared with Manner 1, Manner 3 has a particular delay.

Manner 4 includes the following four steps.

Step 5075: The terminal determines whether the attribute information of the object corresponding to the identification information of the object is locally stored, to obtain a determining result.

Step 5076: When the determining result indicates that the attribute information of the object corresponding to the identification information of the object is locally stored, the terminal locally obtains the attribute information of the object according to the identification information of the object, the attribute information of the object being obtained together when the terminal requests the video from a server.

Step 5077: When the determining result indicates that the attribute information of the object corresponding to the identification information of the object is not locally stored, the terminal sends the identification information of the object to a server, to trigger the server to obtain the attribute information of the object according to the identification information of the object, and sends the attribute information of the object to the terminal.

Step 5078: The terminal receives the attribute information of the object sent by the server.

Manner 4 is a compromise solution between Manner 1 and Manner 3 in the foregoing. In Manner 4, attribute information of all the objects are not requested when a video resource is being requested. Therefore, it is first determined whether the attribute information of the object is stored. Step 5077 is the same as Manner 3, and therefore, details are not described herein.

As compared with the technical solution of Embodiment 1, the technical solution provided in Embodiment 5 of the present application has the following beneficial effects: In this implementation, a terminal first pauses a video and then determines, according to a first input operation of a user, identification information of an object to be requested. The video is paused because only several frames have the object in which a user is interested during playing of the video. In other words, during such a short time period, if the terminal presents obtained attribute information of the object to the user, it is possible that before the user even sees the attribute information of the object, the object in which the user is interested is no longer being played. Therefore, a pause operation is added in the technical solution provided in this implementation of the present application.

Embodiment 6

Based on the foregoing implementations, this implementation of the present application further provides an information processing method applied to a terminal. Functions implemented by the information processing method may be implemented by a processor in the terminal invoking a program code. Certainly, the program code may be stored in a computer storage medium. Hence, the terminal at least includes the processor and the storage medium.

Figures 1, 6:
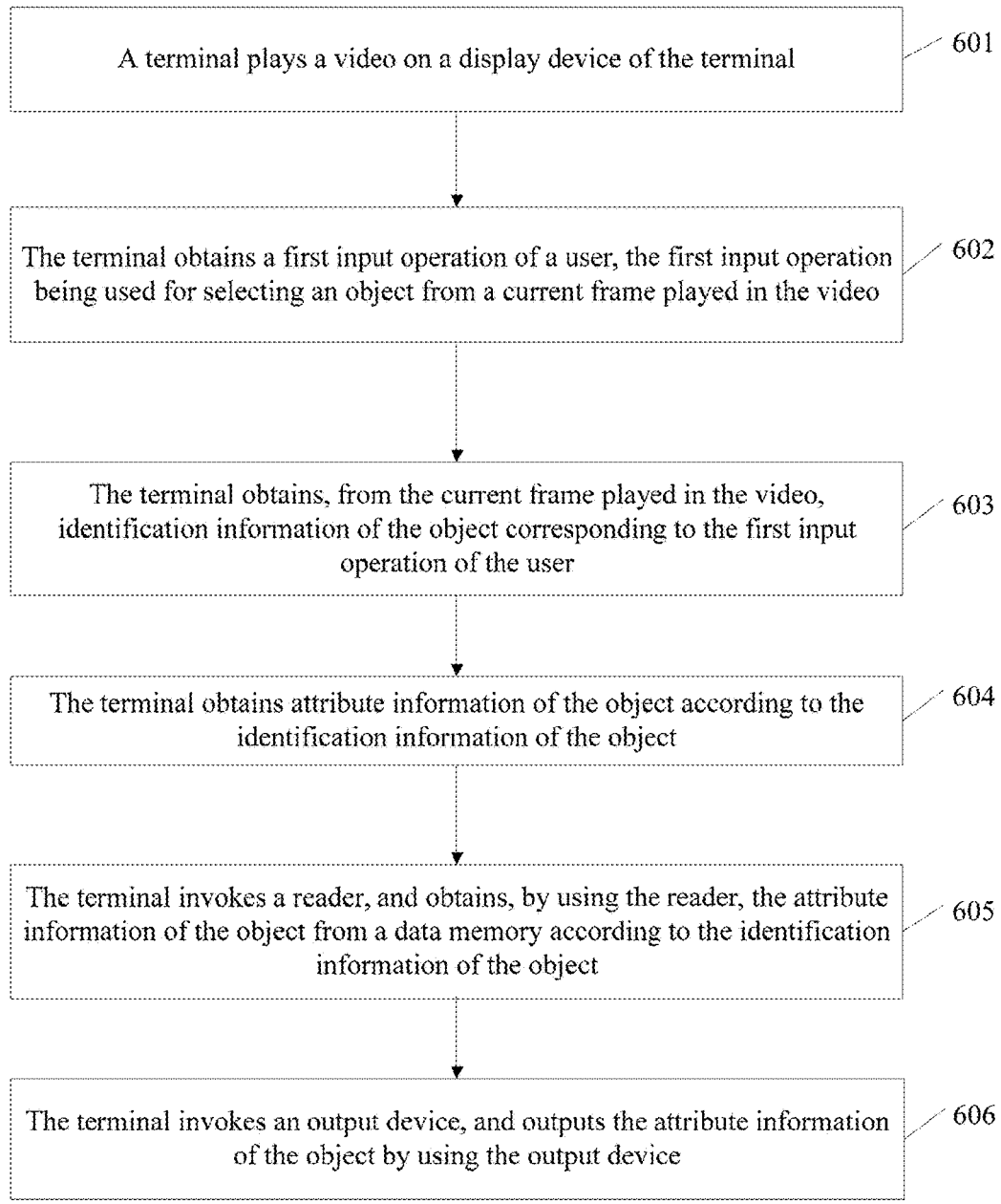
Figures 2, 6:
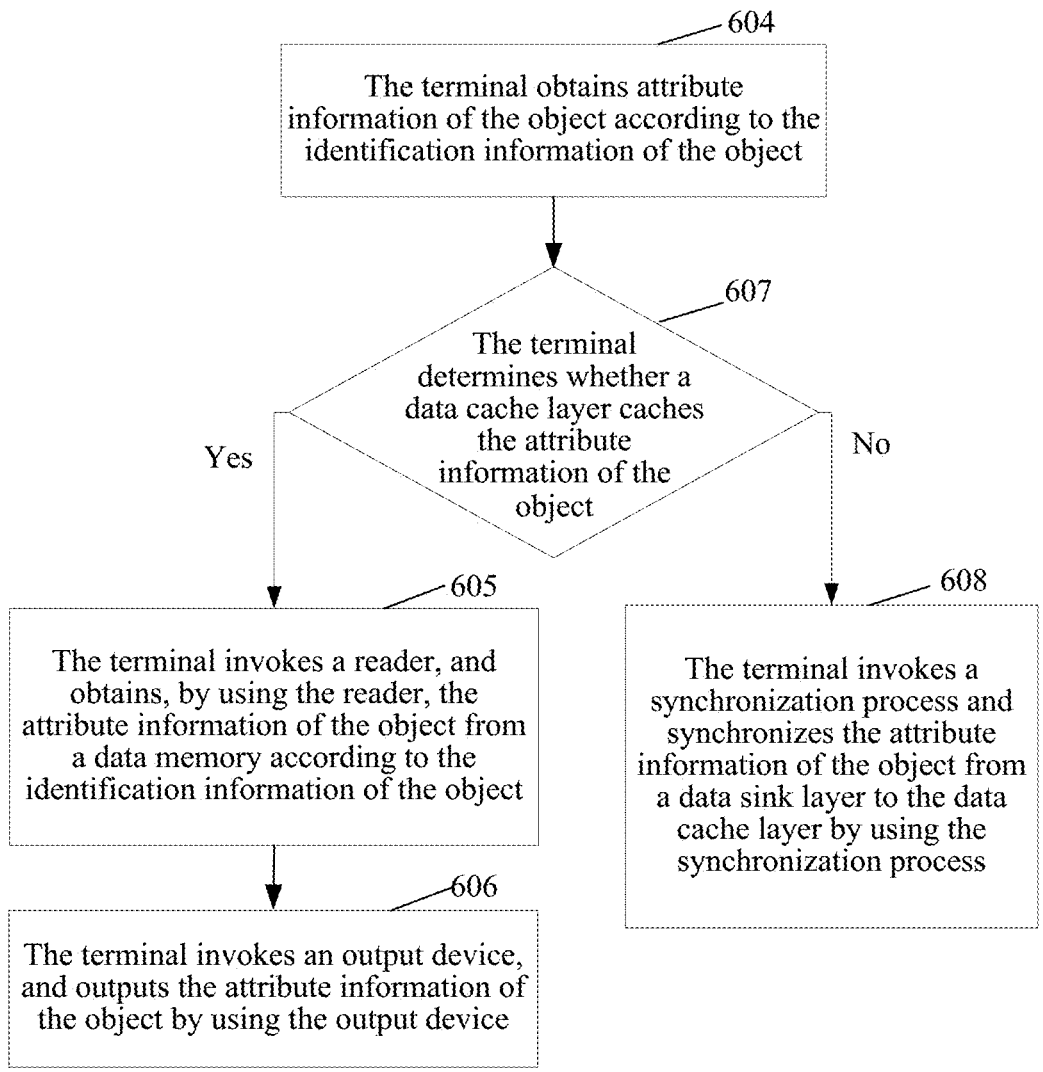

FIG. 6-1 is a schematic flowchart of implementing an information processing method according to Embodiment 6 of the present application. As shown in FIG. 6-1, the information processing method includes:

Step 601: A terminal plays a video on a display device of the terminal.

Step 602: The terminal obtains a first input operation of a user, the first input operation being used for selecting an object from a current frame played in the video.

Step 603: The terminal obtains, from the current frame played in the video, identification information of the object corresponding to the first input operation of the user.

Step 604: The terminal obtains attribute information of the object according to the identification information of the object.

Here, Step 601 to Step 604 respectively correspond to Step 101 to Step 104 in Embodiment 1. Therefore, a person skilled in the art may refer to Embodiment 1 to understand Step 101 to Step 104 in the foregoing. For the purpose of brevity, details are not described herein.

Step 605: The terminal invokes a reader, and obtains, by using the reader, the attribute information of the object from a data memory according to the identification information of the object.

Here, the reader is an application program, and can read data (identification information of an object).

Here, the data memory refers to a data cache layer, and the terminal stores the attribute information of the object in the data memory in advance. During playing of the video, the terminal caches the attribute information of the object first, so that the playing is relatively fast.

Step 606: The terminal invokes an output device, and outputs the attribute information of the object by using the output device.

Here, the output device is also an application program, and can output data (attribute information of an object).

In this implementation, Step 605 and Step 606 in the foregoing actually provide a manner of implementing display of the attribute information of the object by the terminal (Step 105). In Step 606, that the terminal invokes an output device, and outputs the attribute information of the object by using the output device includes: invoking, by the terminal, the output device, and outputting the attribute information of the object by using the output device in a manner of a floating layer.

In this implementation of the present application, as shown in FIG. 6-2, before Step 605, the method may further include:

Step 607: The terminal determines whether the data cache layer caches the attribute information of the object, and if yes, the process turns to Step 605, or otherwise, the process turns to Step 608.

Step 608: The terminal invokes a synchronization process, and synchronizes the attribute information of the object from a data sink layer to the data cache layer by using the synchronization process. The process turn turns to Step 605.

Here, the synchronization process is also an application program, and can synchronize data between the data sink layer and the data cache layer. The data sink layer may be understood as a hard disk or a magnetic disk of the terminal. In this implementation, if the data cache layer does not have corresponding data, the corresponding data is synchronized from the data sink layer by using the synchronization process.

Embodiment 7

Based on the foregoing implementations, this implementation of the present application further provides an information processing method applied to a terminal. Functions implemented by the information processing method may be implemented by a processor in the terminal invoking a program code. Certainly, the program code may be stored in a computer storage medium. Hence, the terminal at least includes the processor and the storage medium.

Figures 1, 7:
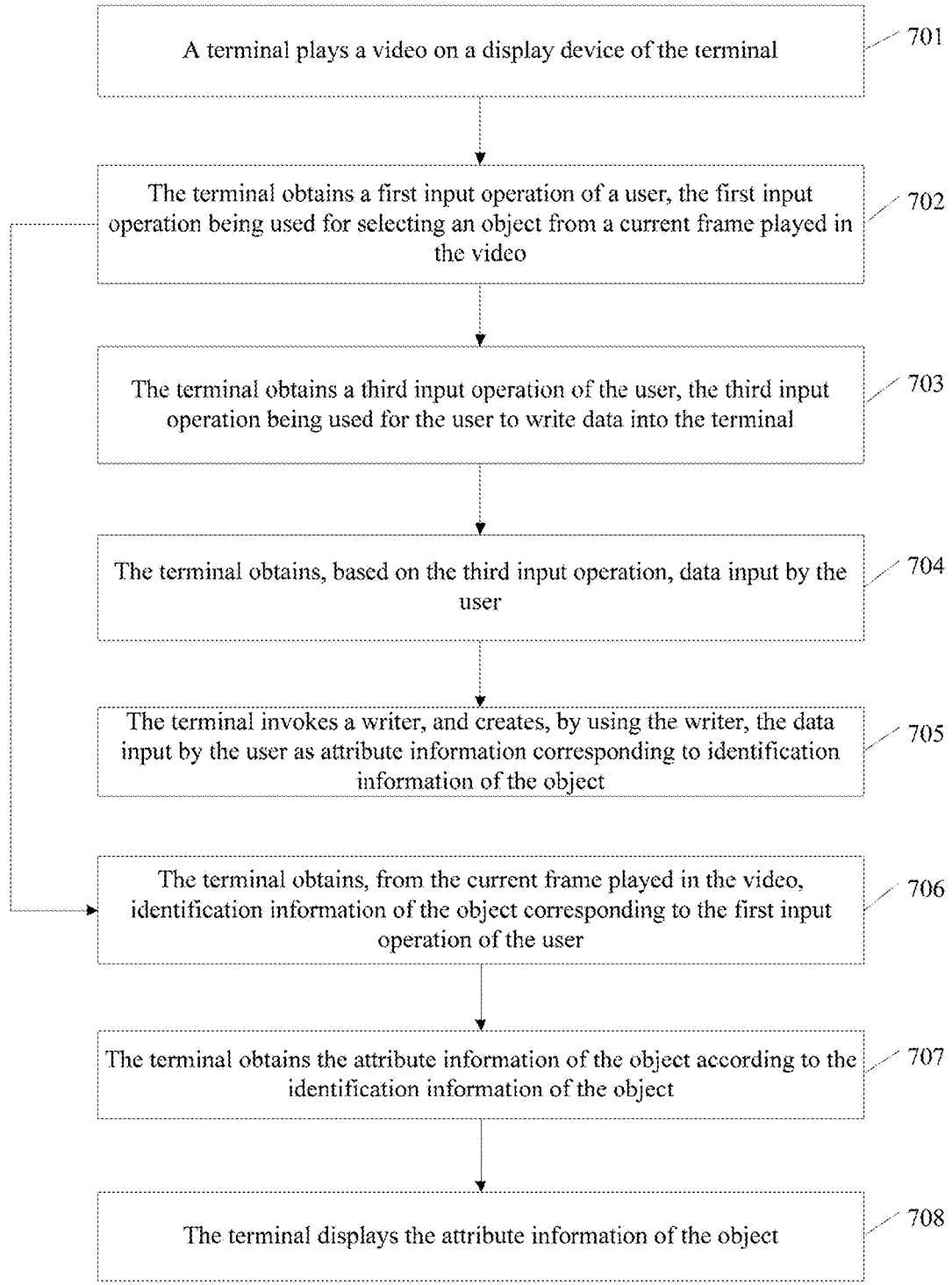
Figures 2, 7:
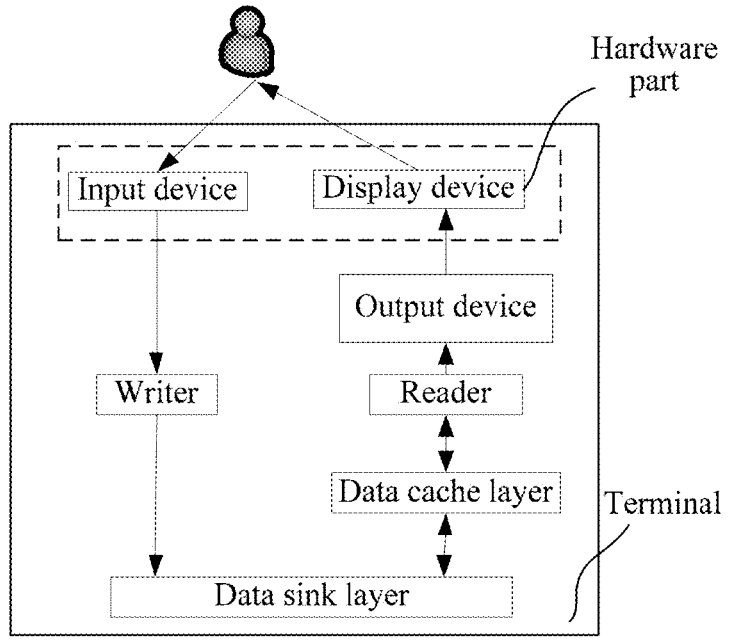

FIG. 7-1 is a schematic flowchart of implementing an information processing method according to Embodiment 7 of the present application. As shown in FIG. 7-1, the information processing method includes:

Step 701: A terminal plays a video on a display device of the terminal.

Step 702: The terminal obtains a first input operation of a user, the first input operation being used for selecting an object from a current frame played in the video.

Here, Step 701 and Step 702 respectively correspond to Step 101 and Step 102 in Embodiment 1. Therefore, a person skilled in the art may refer to Embodiment 1 to understand Step 101 and Step 102 in the foregoing. For the purpose of brevity, details are not described herein.

Step 703: The terminal obtains a third input operation of the user, the third input operation being used for the user to write data into the terminal.

Here, the third input operation differs according to different input devices of the terminal. The third input operation is similar to the foregoing first input operation, and therefore, details are not described herein.

Step 704: The terminal obtains, based on the third input operation, data input by the user.

Here, the data input by the user is data information associated with the identification information of the object.

Step 705: The terminal invokes a writer, and creates, by using the writer, the data input by the user as the attribute information corresponding to the identification information of the object.

Here, the writer is also an application program, and can create the data input by the user as the attribute information corresponding to the identification information of the object.

Step 706: The terminal obtains, from the current frame played in the video, identification information of the object corresponding to the first input operation of the user.

Step 707: The terminal obtains the attribute information of the object according to the identification information of the object.

Step 708: The terminal displays the attribute information of the object.

Here, Step 706 to Step 708 respectively correspond to Step 103 to Step 105 in Embodiment 1. Therefore, a person skilled in the art may refer to Embodiment 1 to understand Step 103 to Step 105 in the foregoing. For the purpose of brevity, details are not described herein.

The writer in Step 705 in this implementation of the present application and the reader and the output device in Embodiment 6 may be implemented on a device in a program form. FIG. 7-2 is a schematic diagram of a relationship among the writer, the reader, and the output device in this implementation of the present application. As shown in FIG. 7-2, the writer, the reader, and the output device may be application programs (software), the data sink layer and the data cache layer may be hardware, and the input device and the display device of the terminal are hardware. For functions of the writer, the reader, and the output device in FIG. 7-2, reference may be made to the disclosure of Embodiment 6 and Step 705 in Embodiment 7 in the foregoing for understanding, and therefore, details are not described herein. It should be noted that the functions of the writer, the reader, and the output device are applied to the terminal. However, the functions can also be applied to the server. In other words, the functions implemented by the terminal may also be implemented on the server end. In this way, after Step 704, the terminal may directly send the data input by the user and the identification information of the object to the server, and the server creates the data input by the user as the attribute information corresponding to the identification information of the object. In this way, other uses may see content input by the user (a video player is equivalent to a self-controlled media).

In this implementation of the present application, after Step 705, the method may further include: sending, by the terminal, the data input by the user and the identification information of the object to the server, and the server creates the data input by the user as the attribute information corresponding to the identification information of the object.

The technical solution provided in this implementation of the present application has the following effects: A user may submit personal description information of an object in a video by using an input device on a terminal. Hence, in the technical solution provided in this implementation of the present application, a user is allowed to submit personal description information of an object in a video. In this way, users that have common interests and hobbies can be associated, and the users may comment to each other. This provides a new interaction manner to users that watch a video. It can be seen from the foregoing description that in the technical solution provided in this implementation of the present application, a video player installed on a terminal not only is a video playing platform, but also may be a self-controlled media platform. Information of an article that appears in a video is maintained by a user watching the video. Therefore, article information is extended more conveniently and article information becomes richer.

Embodiment 8

Based on the foregoing information processing method, this implementation of the present application provides an information processing apparatus. A playing unit, a first obtaining unit, a second obtaining unit, a third obtaining unit, and a display unit that are included in the apparatus may be implemented by using a processor in a terminal, and certainly may also be implemented by using a specific logic circuit. In a specific implementation, the processor may be a central processing unit (CPU), a microprocessor unit (MPU), a digital signal processor (DSP), or a field programmable gate array (FPGA).

Figure 8:
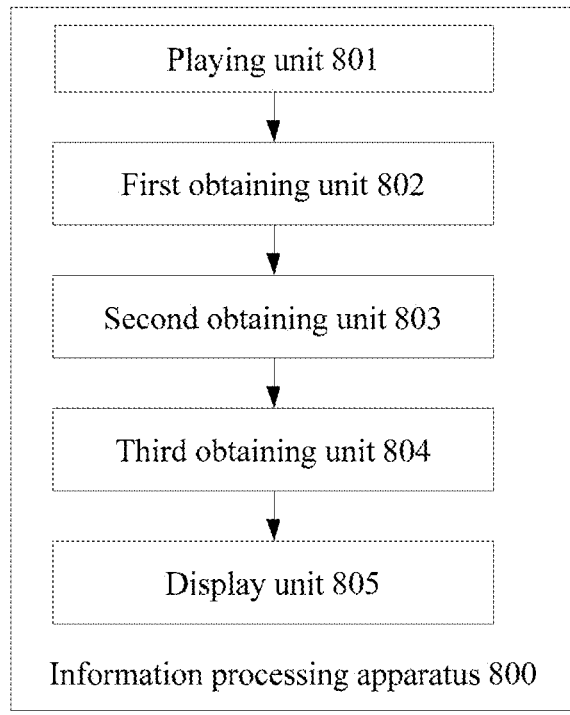
FIG. 8 is a schematic composition structural diagram of an information processing apparatus according to Embodiment 8 of the present application.

FIG. 8 is a schematic composition structural diagram of an information processing apparatus according to Embodiment 8 of the present application. As shown in FIG. 8, an information processing apparatus 800 includes a playing unit 801, a first obtaining unit 802, a second obtaining unit 803, a third obtaining unit 804, and a display unit 805.

The playing unit 801 is configured to play a video on a display device of a terminal.

The first obtaining unit 802 is configured to obtain a first input operation of a user, the first input operation being used for selecting an object from a current frame played in the video.

The second obtaining unit 803 is configured to obtain, from the current frame played in the video, identification information of the object corresponding to the first input operation of the user.

The third obtaining unit 804 is configured to obtain attribute information of the object according to the identification information of the object.

The display unit 805 is configured to display the attribute information of the object.

Embodiment 9

Based on the foregoing implementations, this implementation of the present application provides an information processing apparatus. A playing unit, a fourth obtaining unit, a first obtaining unit, a second obtaining unit, a third obtaining unit, and a display unit that are included in the information processing apparatus, and a positioning module, a first obtaining module, and a determining module that are included in the second obtaining unit may be implemented by using a processor in a terminal, and certainly may also be implemented by using a specific logic circuit. In a specific implementation, the processor may be a CPU, an MPU, a DSP, or an FPGA.

Figure 9:
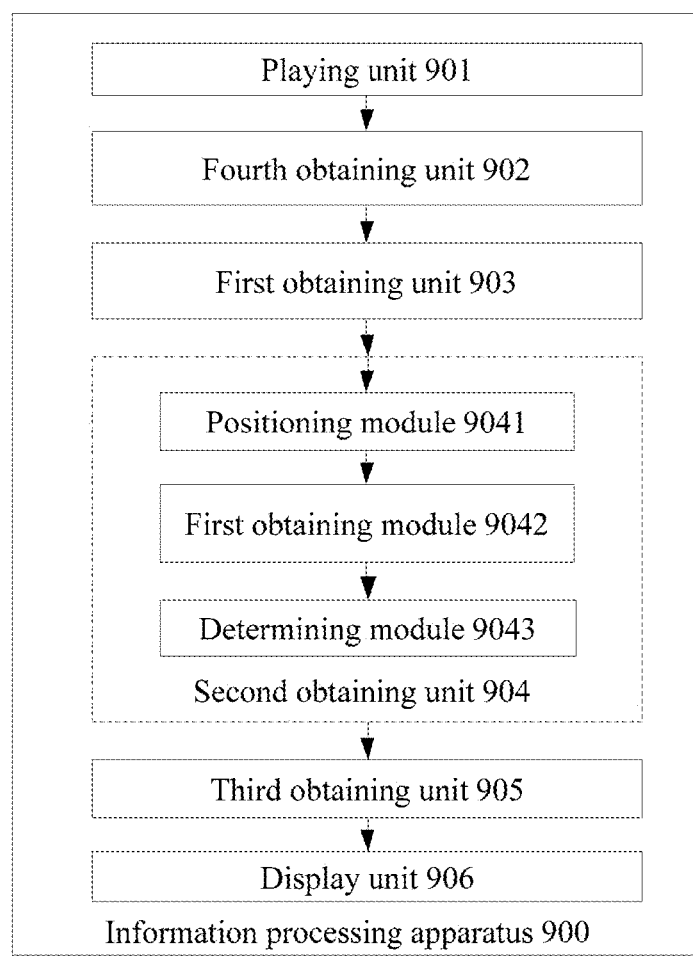
FIG. 9 is a schematic composition structural diagram of an information processing apparatus according to Embodiment 9 of the present application.

FIG. 9 is a schematic composition structural diagram of an information processing apparatus according to Embodiment 9 of the present application. As shown in FIG. 9, an information processing apparatus 900 includes a playing unit 901, a fourth obtaining unit 902, a first obtaining unit 903, a second obtaining unit 904, a third obtaining unit 905, and a display unit 906. The second obtaining unit 904 includes a positioning module 9041, a first obtaining module 9042, and a determining module 9043.

The playing unit 901 is configured to play a video on a display device of a terminal.

The fourth obtaining unit 902 is configured to obtain a second input operation of a user during a process of playing the video, the second input operation being used for pausing the video.

The first obtaining unit 903 is configured to obtain a first input operation of the user, the first input operation being used for selecting an object from a current frame played in the video.

The positioning module 9041 is configured to position the first input operation of the user to obtain location information of the first input operation.

The first obtaining module 9042 is configured to obtain video information of the video and a frame number of the current frame.

The determining module 9043 is configured to determine the identification information of the object according to the video information of the video, the frame number of the current frame, and the location information of the first input operation.

The third obtaining unit 905 is configured to obtain attribute information of the object according to the identification information of the object.

The display unit 906 is configured to display the attribute information of the object.

In this implementation of the present application, the third obtaining unit is configured to locally obtain the attribute information of the object according to the identification information of the object, the attribute information of the object being obtained together when the terminal requests the video on a server.

In this implementation of the present application, the third obtaining unit is configured to invoke a search engine, and obtain attribute information corresponding to the identification information of the object by using the search engine.

In this implementation of the present application, the third obtaining unit includes a sending module and a receiving module.

The sending module is configured to send the identification information of the object to the server, to trigger the server to obtain the attribute information of the object according to the identification information of the object, and send the attribute information of the object to the terminal.

The receiving module is configured to receive the attribute information of the object sent by the server.

In this implementation of the present application, the third obtaining unit includes a determining module, a second obtaining module, a sending module, and a receiving module.

The determining module is configured to: determine whether the attribute information of the object corresponding to the identification information of the object is locally stored, to obtain a determining result; when the determining result indicates that the attribute information of the object corresponding to the identification information of the object is locally stored, trigger the second obtaining module; and when the determining result indicates that the attribute information of the object corresponding to the identification information of the object is not locally stored, trigger the sending module.

The second obtaining module is configured to locally obtain the attribute information of the object according to the identification information of the object, the attribute information of the object being obtained together when the terminal requests the video on a server.

The sending module is configured to: when the determining result indicates that the attribute information of the object corresponding to the identification information of the object is not locally stored, send the identification information of the object to a server, to trigger the server to obtain the attribute information of the object according to the identification information of the object, and send the attribute information of the object to the terminal.

The receiving module is configured to receive the attribute information of the object sent by the server.

Embodiment 10

Based on the foregoing implementations, this implementation of the present application provides an information processing apparatus. A playing unit, a first obtaining unit, a second obtaining unit, a third obtaining unit, and a display unit that are included in the information processing apparatus, and a storage module, a first invoking module, and a second invoking module that are included in the display unit may be implemented by using a processor in a terminal, and certainly may also be implemented by using a specific logic circuit. In a specific implementation, the processor may be a CPU, an MPU, a DSP, or an FPGA.

Figure 10:
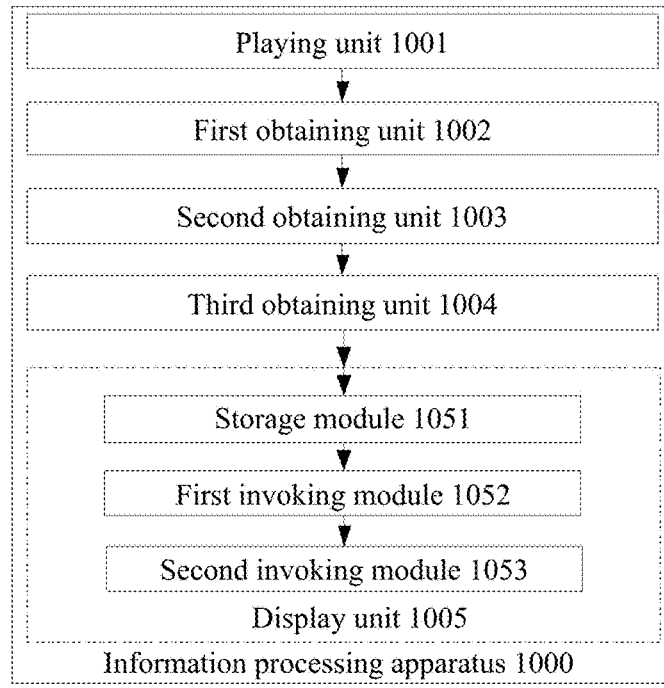
FIG. 10 is a schematic composition structural diagram of an information processing apparatus according to Embodiment 10 of the present application.

FIG. 10 is a schematic composition structural diagram of an information processing apparatus according to Embodiment 10 of the present application. As shown in FIG. 10, an information processing apparatus 1000 includes a playing unit 1001, a first obtaining unit 1002, a second obtaining unit 1003, a third obtaining unit 1004, and a display unit 1005. The display unit 1005 includes a storage module 1051, a first invoking module 1052, and an invoking module 1053.

The playing unit 1001 is configured to play a video on a display device of a terminal.

The first obtaining unit 1002 is configured to obtain a first input operation of the user, the first input operation being used for selecting an object from a current frame played in the video.

The second obtaining unit 1003 is configured to obtain, from the current frame played in the video, identification information of the object corresponding to the first input operation of the user.

The third obtaining unit 1004 is configured to obtain attribute information of the object according to the identification information of the object.

The storage module 1051 is configured to store the attribute information of the object in a data memory.

The first invoking module 1052 is configured to invoke a reader, and obtain, by using the reader, the attribute information of the object from the data memory according to the identification information of the object.

The second invoking module 1053 is configured to invoke an output device, and output the attribute information of the object by using the output device.

Here, the second invoking module is configured to invoke an output device, and output the attribute information of the object by using the output device in a manner of a floating layer.

Embodiment 11

Based on the foregoing implementations, this implementation of the present application provides an information processing apparatus. A playing unit, a first obtaining unit, a second obtaining unit, a third obtaining unit, a display unit, a fifth obtaining unit, a sixth obtaining unit, and an invoking unit that are included in the information processing apparatus may be implemented by using a processor in a terminal, and certainly may also be implemented by using a specific logic circuit. In a specific implementation, the processor may be a CPU, an MPU, a DSP, or an FPGA.

Figure 11:
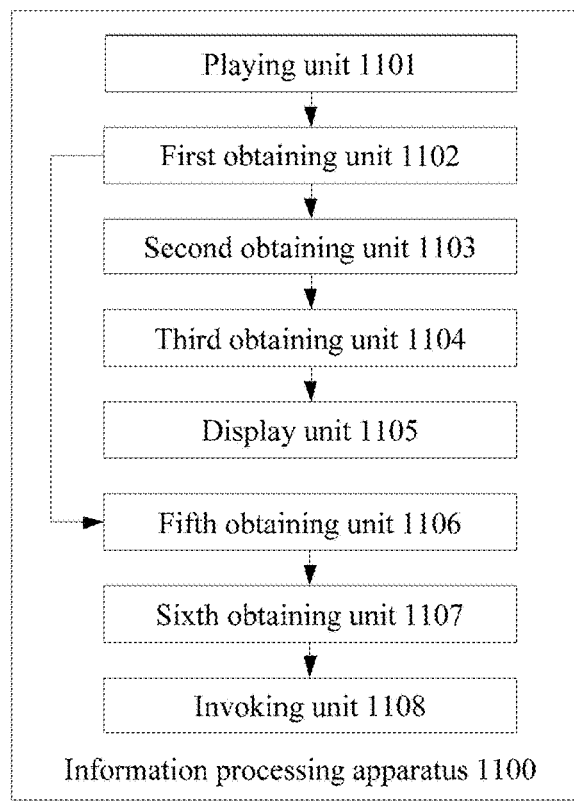
FIG. 11 is a schematic composition structural diagram of an information processing apparatus according to Embodiment 11 of the present application.

FIG. 11 is a schematic composition structural diagram of an information processing apparatus according to Embodiment 11 of the present application. As shown in FIG. 11, an information processing apparatus 1100 includes a playing unit 1101, a first obtaining unit 1102, a second obtaining unit 1103, a third obtaining unit 1104, a display unit 1105, a fifth obtaining unit 1106, a sixth obtaining unit 1107, and an invoking unit 1108.

The playing unit 1101 is configured to play a video on a display device of a terminal.

The first obtaining unit 1102 is configured to obtain a first input operation of a user, the first input operation being used for selecting an object from a current frame played in the video.

The second obtaining unit 1103 is configured to obtain, from the current frame played in the video, identification information of the object corresponding to the first input operation of the user.

The third obtaining unit 1104 is configured to obtain attribute information of the object according to the identification information of the object.

The display unit 1105 is configured to display the attribute information of the object.

The fifth obtaining unit 1106 is configured to obtain a third input operation of the user, the third input operation being used for the user to write data into the terminal.

The sixth obtaining unit 1107 is configured to obtain, based on the third input operation, data input by the user.

The invoking unit 1108 is configured to invoke a writer and create, by using the writer, the data as the attribute information corresponding to the identification information of the object.

It should be pointed out here that description of Embodiments 8 to 11 of the information processing apparatus is similar to that of the implementations of the information processing method, and has beneficial effects similar to those of the implementations of the information processing method. Therefore, details are not described herein. For technical details that are not disclosed in Embodiments 8 to 11 of the information processing apparatus of the present disclosure, refer to the description of the implementations of the information processing method of the present disclosure for understanding. For the purpose of brevity, details are not described herein.

Embodiment 12

Figures 1, 12:
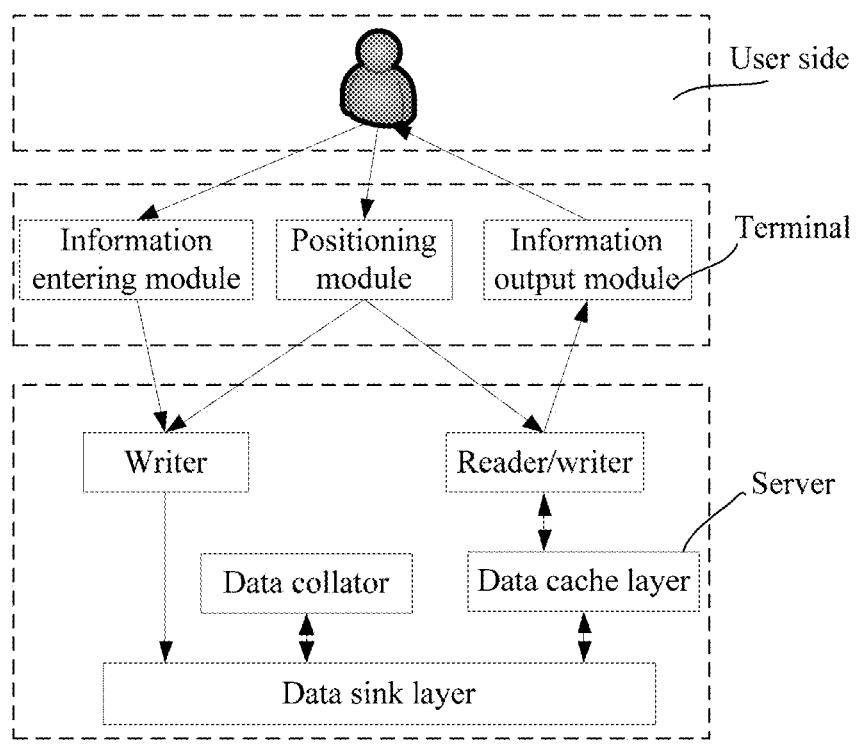
Figures 2, 12:
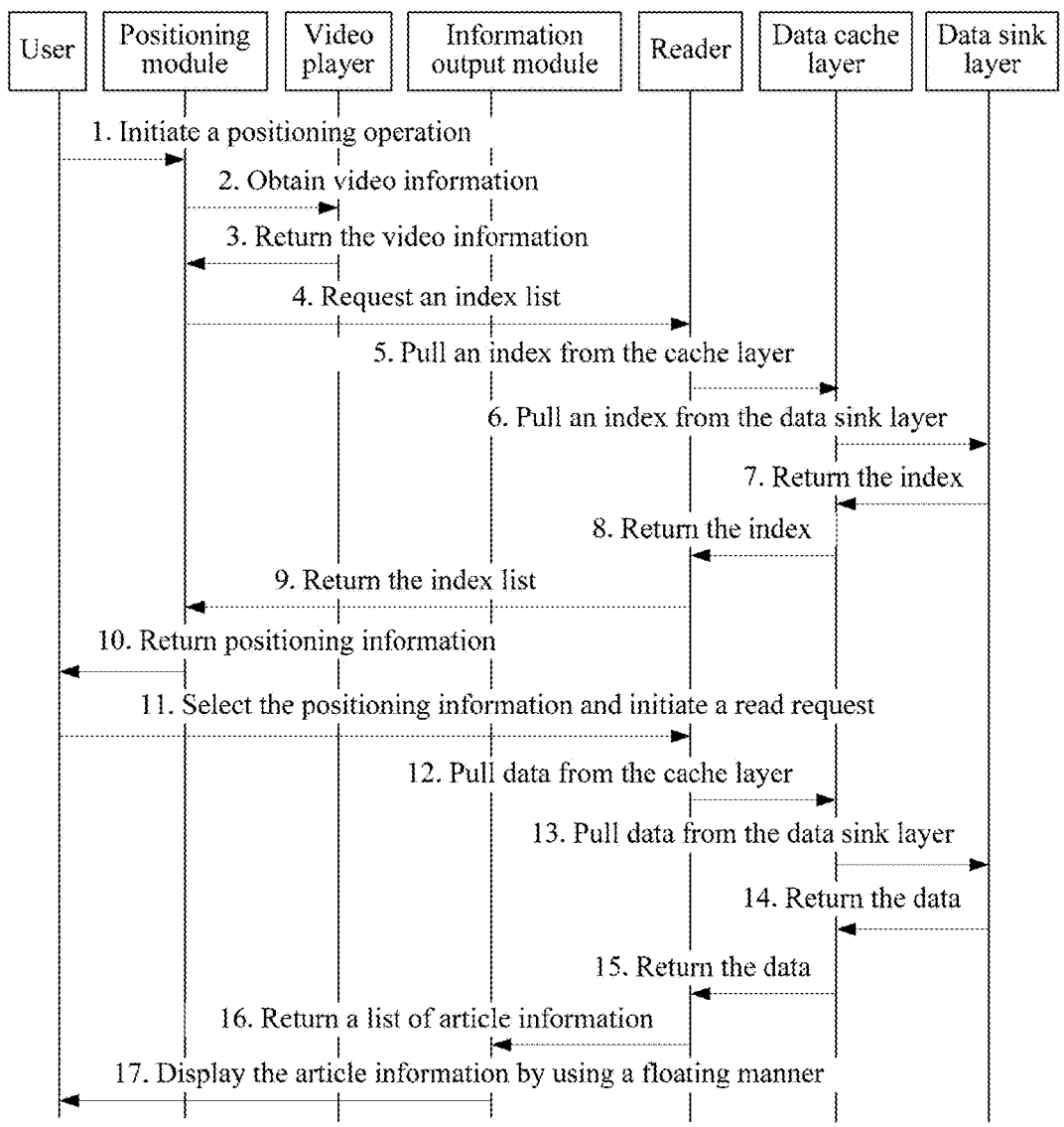
Figures 3, 12:
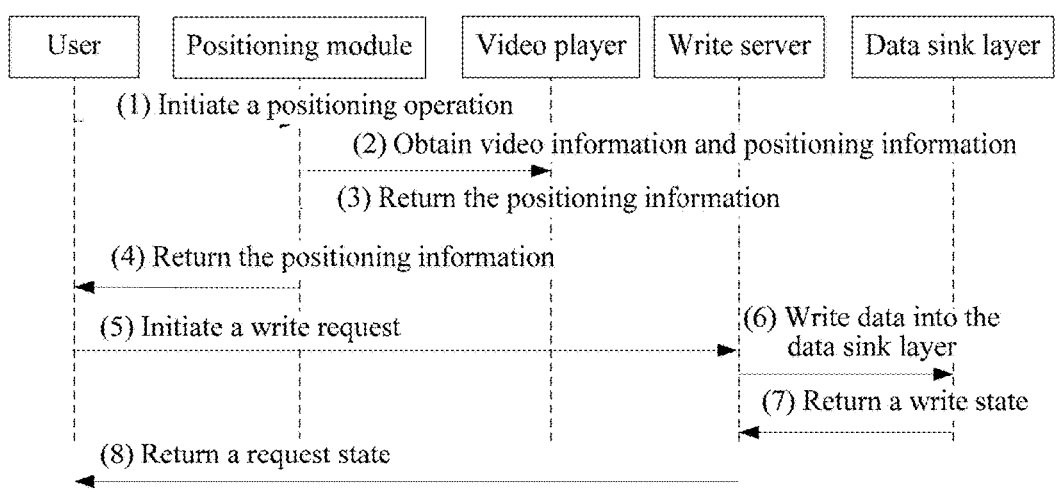

In this implementation of the present application, the foregoing functions implemented on a terminal side are implemented in a server. FIG. 12-1 is a schematic composition structural diagram of a terminal and a server according to Embodiment 12 of the present application. As shown in FIG. 12-1, the terminal includes a positioning module, an information entering module, an information processing and storage module, and the server includes a writer, a reader/writer, a data collator, a data cache layer, and a data sink layer.

The positioning module is configured to obtain location information (a relative position) of an object in a video and a frame number (may be a frame sequence number) of a current frame. The terminal uses the location information of the object and the frame number of the current frame as index information of the object.

The information entering module is configured to provide an interface for a user to enter description information of the object in the video by.

An information output module is configured to obtain attribute information of a corresponding object according to the location information of an object corresponding to an operation of the user, and output the attribute information to the user.

The server is configured to be responsible for performing information collation and data convergence on the input of the user, storing the input, and generating corresponding information lists according to different dimensions (for example, a quantity of positive comments from users, and posting time). The information processing and storage module includes a reader, a writer, a data collation server, a data cache layer, and a data sink layer.

The writer is configured to process a write request from outside and write data into the data sink layer.

The reader is configured to process a read request from outside. In order to improve system performance, the data cache layer is added between the reader and the data sink layer. The reader reads data from the data cache layer and returns the data to the information output module. The data cache layer communicates with the data sink layer, and outdates and updates cached data.

The data sink layer is configured to store data.

The data collator is configured to be responsible for continuously collating the data of the data sink layer and making the data of the data sink layer converge.

As shown in FIG. 12-2, a process of using the terminal and the server that are shown in FIG. 12-1 to display the attribute information of the object to the user includes the following steps.

Step 1: In a process of watching a video, the user finds an article in which the user is interested, pauses playing of the video, and initiates a positioning operation (a first input operation).

Step 2: The positioning module obtains video information (such as an ID and resolution of the video) and a frame number of a frame (a current frame) of a current picture from a video player.

Step 3: The video player returns the video information to the positioning module.

Step 4: The positioning module requests an index list from the reader according to the video information and the frame number of the current frame.

Step 5: The reader pulls indexes from the data cache layer.

Step 6: If the data cache layer does not have a corresponding index list, synchronize data of the corresponding index list from the data sink layer to the data cache layer by means of a synchronization process.

Step 7: The data sink layer returns the index list to the data cache layer.

Step 8: The data cache layer returns the indexes to a data reading cache.

Step 9: The reader returns index data to the positioning module.

Step 10: The positioning module converts all the indexes into corresponding positioning information, and returns the positioning information to the user.

Step 11: The user initiates a data read request to a reader according to the positioning information obtained by the positioning module.

Step 12: The reader receives a scheduling request of the user, and pulls data from the data cache layer after parsing request information.

Step 13: If the data cache layer does not have corresponding data, the data cache layer synchronizes corresponding data from the data sink layer by using the synchronization process.

Step 14: The data sink layer synchronizes data to the data cache layer.

Step 15: The data cache layer returns data to the reader.

Step 16: The reader returns the data to a front-end information output module, and an information data module returns the pulled information in a manner of a floating layer.

As shown in FIG. 12-3, a process of using the terminal and the server that are shown in FIG. 12-1 to implement addition of the attribute information of the object by the user includes the following steps.

Step 1: In a process of watching a video, the user finds an article in which the user is interested, pauses playing of the video, and initiates a positioning operation.

Step 2: The positioning module obtains, from a video player, information such as video information (such as an ID and resolution of the video), a frame sequence number of a current picture, and a relative location of a positioning area in the picture.

Step 3: The video player returns positioning information to the positioning module.

Step 4: The positioning module obtains the positioning information of the article, and returns the information to the user.

Step 5: The user initiates a write request to the writer, the request carrying the related positioning information and related information entered by the user.

Step 6: The writer establishes an index for a message according to the positioning information of the article and the video information, and writes data into a data sink layer.

Step 7: The data sink layer stores upper layer data into a storage medium, and returns a write state to the writer.

Step 8: The writer returns a request state to the user.

The technical solution provided in this implementation of the present application can produce the following beneficial effects: More information about an object in a video is presented in a manner of a floating layer, and a user may easily obtain more article information without additional search work. A user may add attribute information of an object that appears in a video. Users that have common interests and hobbies are associated, and the users may comment to each other. This provides a new interaction manner to users that watch a video. Meanwhile, the users that watch the video may maintain added attribute information of objects. Therefore, attribute information of an object is extended more conveniently and becomes richer.

In this implementation, units, for example, the playing unit, the first obtaining unit, the second obtaining unit, the third obtaining unit, and the display unit that are included in the information processing apparatus, and modules included in the units, for example, the positioning module, the first obtaining module, and the determining module that are included in the second obtaining unit, may be implemented by using a processor in the terminal, and certainly may also be implemented by using a specific logic circuit. In a specific implementation, the processor may be a CPU, an MPU, a DSP, or an FPGA.

It should be noted that in this implementation of the present application, if the foregoing information processing method is implemented in a form of a software functional module and sold or used as an independent product, the information processing method may be stored in a computer-readable storage medium. Based on such an understanding, the technical solutions of this implementation of the present application essentially, or the part contributing to the prior art may be implemented in a form of a software product. The software product is stored in a storage medium, and includes several instructions for instructing a computer device (which may be a personal computer, a server, or a network device) to perform all or some of the methods described in the implementations of the present application. The foregoing storage medium includes: any medium that can store program code, such as a USB flash drive, a removable hard disk, a read-only memory (ROM), a magnetic disk, or an optical disc. In this way, this implementation of the present application is not limited to any combination of specific hardware and software.

Correspondingly, this implementation of the present application further provides a computer storage medium, the computer storage medium storing a computer executable instruction, and the computer executable instruction being used for executing the information processing method provided in this implementation of the present application.

Based on the foregoing implementations, this implementation of the present application provides a terminal, the terminal including:

a display device (such as a display screen), configured to display a video to be played, and display attribute information that is of an object and is output by a processing apparatus; and the processing apparatus (such as a processor), configured to: play the video on the display device; obtain a first input operation of a user, the first input operation being used for selecting an object from a current frame displayed in the video; obtain, from the current frame played in the video, identification information of the object corresponding to the first input operation of the user; obtain the attribute information of the object according to the identification information of the object; and display the attribute information of the object on the display device.

Based on the foregoing implementations, this implementation of the present application provides a terminal, the terminal including:

a storage medium, configured to store a computer executable instruction; and a processor, configured to: execute the computer executable instruction stored on the storage medium, the computer executable instruction including: playing a video on a display device; obtaining a first input operation of a user, the first input operation being used for selecting an object from a current frame played in the video; obtaining, from the current frame played in the video, identification information of the object corresponding to the first input operation of the user; obtaining attribute information of the object according to the identification information of the object; and displaying the attribute information of the object on the display device.

It should be understood that "one implementation" or "an implementation" in the entire text of the description indicates that specific features, structures, or characteristics related to the implementations are included in at least one implementation of the present disclosure.

Therefore, "in one implementation" or "in an implementation" appearing in the entire description may not refer to a same implementation. In addition, these specific features, structures, or characteristics may be combined in one or more Embodiment in any suitable manner. It should be understood that in implementations of the present application, an order of sequence numbers of processes does not indicate an order of an execution sequence, and the execution sequence of the processes should be determined according to functions and inner logics, and do not constitute any limitation on an implementation process of the implementations of the present application.

In the several implementations provided in the present application, it should be understood that the disclosed device and method may be implemented in other manners. The described device implementations are merely exemplary. For example, the unit division is merely logical function division and may be other division manners in actual implementation. For example, a plurality of units or components may be combined or integrated into another system, or some features may be omitted or not performed. In addition, the displayed or discussed mutual couplings or direct couplings or communication connections of composition parts may be implemented through some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the implementations.

In addition, functional units in the implementations of the present application may be integrated into one processing unit, or each of the units may be separately used as one unit alone, or two or more units are integrated into one unit. The integrated unit may be implemented in a form of hardware, or may be implemented in a form of hardware in addition to a software functional unit.

A person of ordinary skilled in the art may understand that all or some of the steps of the method implementations may be implemented by a program instructing related hardware. The program may be stored in a computer-readable storage medium. When the program runs, the steps of the method implementations are performed. The foregoing storage medium includes: any medium that can store program code, such as a removable storage device, a ROM, a magnetic disk, or an optical disc.

Alternatively, when the integrated unit of the present disclosure is implemented in the form of a software functional module and sold or used as an independent product, the integrated unit may be stored in a computer-readable storage medium. Based on such an understanding, the technical solutions of this implementation of the present application essentially, or the part contributing to the prior art may be implemented in a form of a software product. The software product is stored in a storage medium, and includes several instructions for instructing a computer device (which may be a personal computer, a server, or a network device) to perform all or some of the methods described in the implementations of the present application. The foregoing storage medium includes: any medium that can store program code, such as a removable storage device, a ROM, a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

INDUSTRIAL APPLICABILITY

In the implementations of the present application, a terminal plays a video on a display device of the terminal; the terminal obtains a first input operation of a user, the first input operation being used for selecting an object from a current frame played in the video; the terminal obtains, from the current frame played in the video, identification information of the object corresponding to the first input operation of the user; the terminal obtains attribute information of the object according to the identification information of the object; and the terminal displays the attribute information of the object. In this way, attribute information of an object in which a user is interested in a video can be presented to the user, so as to save the user the trouble of searching for the object, so that the user can easily learn more information about the object in the video, thereby improving user experience.

What is claimed is:

1. An information processing method performed at a terminal having one or more processors and memory for storing programs to be executed by the one or more processors, the method comprising:
while playing a video on a display device of the terminal, obtaining a video pause operation from a user and pausing the video at a current frame according to the video pause input operation;
receiving a first operation on selecting a specific location of the current frame from the user;
in response to the first operation:
selecting, within the current frame, an object occupying the specific location of the current frame corresponding to the first operation of the user;
obtaining, from the current frame played in the video, identification information of the user-selected object;
obtaining attribute information of the user-selected object according to the identification information of the user-selected object;
identifying, from the video, a preset video segment including a sequence of video frames containing the user-selected object and ending with the current frame; and
repeatedly replaying the video segment on the display device while displaying the attribute information of the user-selected object on top of the video segment until the first operation is terminated.

2. The method according to claim 1, further comprising:
after the first operation is terminated:
ceasing the replay of the video segment and the display of the attribute information of the user-selected object; and
resuming the play of the video.

3. The method according to claim 1, wherein obtaining, from the current frame played in the video, identification information of the user-selected object further comprises:
obtaining video information of the video and a frame number of the current frame; and
determining the identification information of the user-selected object according to the video information of the video, the frame number of the current frame, and the specific location of the current frame occupied by the object.

4. The method according to claim 1, wherein obtaining attribute information of the user-selected object according to the identification information of the user-selected object further comprises:
locally obtaining the attribute information of the user-selected object according to the identification information of the user-selected object, wherein the attribute information of the user-selected object is downloaded to the terminal along with the video from a remote server.

5. The method according to claim 4, wherein obtaining attribute information of the user-selected object according to the identification information of the user-selected object further comprises:
determining whether the attribute information of the user-selected object corresponding to the identification information of the user-selected object is locally stored, to obtain a determining result;
in accordance with a determination that the attribute information is locally stored, locally obtaining the attribute information of the user-selected object according to the identification information of the object; and
in accordance with a determination that the attribute information is not locally stored:
sending the identification information of the user-selected object to the remote server, so as to trigger the server to obtain the attribute information of the user-selected object according to the identification information of the user-selected object and return the attribute information of the user-selected object to the terminal; and
receiving the attribute information of the user-selected object sent by the remote server.

6. The method according to claim 1, wherein the preset video segment has a fixed length ending with the current frame and the operation of replaying the preset video segment on the display device further comprises replaying the preset video segment repeatedly until a display duration of the attribute information of the user-selected object ends.

7. The method according to claim 6, wherein the display duration of the attribute information of the user-selected object ends when the terminal plays a next frame after the current frame in the video.

8. The method according to claim 1, wherein the preset video segment has a variable length defined by only a set of frames including the user-selected object.

9. The method according to claim 1, wherein the video segment is replayed at a speed lower than a speed at which the video was originally played.

10. The method according to claim 1, further comprising:
after the receiving the first operation from the user:
obtaining a third operation from the user, the third input operation being used by the user to write data into the terminal;
obtaining, based on the third operation, data input by the user; and
invoking a writer to create the data as part of the attribute information corresponding to the identification information of the object.

11. A terminal having one or more processors, memory and a plurality of programs stored in the memory and to be executed by the one or more processors, the plurality of programs comprising instructions for:
while playing a video on a display device of the terminal, obtaining a video pause operation from a user and pausing the video at a current frame according to the video pause input operation;
receiving a first operation on selecting a specific location of the current frame from the user;
in response to the first operation:
selecting, within the current frame, an object occupying the specific location of the current frame corresponding to the first operation of the user;
obtaining, from the current frame played in the video, identification information of the user-selected object;
obtaining attribute information of the user-selected object according to the identification information of the user-selected object;
identifying, from the video, a preset video segment including a sequence of video frames containing the user-selected object and ending with the current frame; and
repeatedly replaying the video segment on the display device while displaying the attribute information of the user-selected object on top of the video segment until the first operation is terminated.

12. The terminal according to claim 11, wherein the plurality of programs further comprise instructions for:
after the first operation is terminated:
ceasing the replay of the video segment and the display of the attribute information of the user-selected object; and
resuming the play of the video.

13. The terminal according to claim 11, wherein the instructions for obtaining, from the current frame played in the video, identification information of the user-selected object further comprise instructions for:
  obtaining video information of the video and a frame number of the current frame; and
  determining the identification information of the user-selected object according to the video information of the video, the frame number of the current frame, and the specific location of the current frame occupied by the object.

14. The terminal according to claim 11, wherein the instructions for obtaining the attribute information of the user-selected object according to the identification information of the user-selected object further comprises instructions for: locally obtaining the attribute information of the user-selected object according to the identification information of the user-selected object, wherein the attribute information of the user-selected object is downloaded to the terminal along with the video from a remote server.

15. The terminal according to claim 14, wherein the instructions for obtaining attribute information of the user-selected object according to the identification information of the user-selected object further comprises:
  determining whether the attribute information of the user-selected object corresponding to the identification information of the user-selected object is locally stored, to obtain a determining result;
  in accordance with a determination that the attribute information is locally stored, locally obtaining the attribute information of the user-selected object according to the identification information of the object; and
  in accordance with a determination that the attribute information is not locally stored:
    sending the identification information of the user-selected object to the remote server, so as to trigger the server to obtain the attribute information of the user-selected object according to the identification information of the user-selected object and return the attribute information of the user-selected object to the terminal; and
    receiving the attribute information of the user-selected object sent by the remote server.

16. The terminal according to claim 11, wherein the preset video segment has a fixed length ending with the current frame and the instructions for replaying the preset video segment on the display device further comprises instructions for replaying the preset video segment repeatedly until a display duration of the attribute information of the user-selected object ends.

17. The terminal according to claim 16, wherein the display duration of the attribute information of the user-selected object ends when the terminal plays a next frame after the current frame in the video.

18. The terminal according to claim 11, wherein the preset video segment has a variable length defined by only a set of frames including the user-selected object.

19. The terminal according to claim 11, wherein the video segment is replayed at a speed lower than a speed at which the video was originally played.

20. A non-transitory computer storage medium storing a plurality of computer executable instructions, and the plurality of computer executable instructions, when executed by a terminal having one or more processors, cause the one or more processors to:
  while playing a video on a display device of the terminal, obtaining a video pause operation from a user and pausing the video at a current frame according to the video pause input operation;
  receiving a first operation on selecting a specific location of the current frame from the user;
  in response to the first operation:
    selecting, within the current frame, an object occupying the specific location of the current frame corresponding to the first operation of the user;
    obtaining, from the current frame played in the video, identification information of the user-selected object;
    obtaining attribute information of the user-selected object according to the identification information of the user-selected object;
    identifying, from the video, a preset video segment including a sequence of video frames containing the user-selected object and ending with the current frame; and
    repeatedly replaying the video segment on the display device while displaying the attribute information of the user-selected object on top of the video segment until the first operation is terminated.

* * * * *